United States Patent [19]
Breton et al.

[11] Patent Number: 6,096,125
[45] Date of Patent: Aug. 1, 2000

[54] INK COMPOSITIONS

[75] Inventors: Marcel P. Breton; Shadi L. Malhotra; Danielle C. Boils; Raymond W. Wong, all of Mississauga; Guerino G. Sacripante, Oakville, all of Canada; John M. Lennon, Newark, Calif.

[73] Assignee: Xerox Corporation, Stamford, Conn.

[21] Appl. No.: 09/300,332

[22] Filed: Apr. 27, 1999

[51] Int. Cl.$^7$ .................................................. C09D 11/00
[52] U.S. Cl. .................................. 106/31.43; 106/31.29; 106/31.61; 106/31.75
[58] Field of Search .................... 106/31.43, 31.75, 106/31.29, 31.61

[56] References Cited

U.S. PATENT DOCUMENTS

| | | | |
|---|---|---|---|
| 3,985,663 | 10/1976 | Lu et al. ............................. | 252/62.1 L |
| 4,490,731 | 12/1984 | Vaught ................................. | 346/140 R |
| 4,751,528 | 6/1988 | Spehrley, Jr. et al. ............... | 346/140 R |
| 4,791,439 | 12/1988 | Guiles ................................. | 346/140 R |
| 4,840,674 | 6/1989 | Schwarz .................................. | 106/22 |
| 4,853,036 | 8/1989 | Koike et al. ............................. | 106/20 |
| 5,006,170 | 4/1991 | Schwarz et al. ........................ | 106/20 |
| 5,041,161 | 8/1991 | Cooke et al. ............................ | 106/22 |
| 5,111,220 | 5/1992 | Hadimioglu et al. ............... | 346/140 R |
| 5,121,141 | 6/1992 | Hadimoglu et al. ................. | 346/140 R |
| 5,122,187 | 6/1992 | Schwarz et al. ......................... | 106/25 |
| 5,124,718 | 6/1992 | Koike et al. ............................. | 346/1.1 |
| 5,286,288 | 2/1994 | Tobias et al. ......................... | 106/20 B |
| 5,371,531 | 12/1994 | Rezanka et al. ......................... | 347/43 |
| 5,382,492 | 1/1995 | El-Sayed et al. ....................... | 430/115 |
| 5,500,668 | 3/1996 | Malhotra et al. ....................... | 347/105 |
| 5,518,534 | 5/1996 | Pearlstine et al. .................... | 106/20 R |
| 5,531,818 | 7/1996 | Lin et al. ............................... | 106/23 C |
| 5,667,568 | 9/1997 | Sacripante et al. ................... | 106/20 R |
| 5,698,017 | 12/1997 | Sacripante et al. ................. | 106/31.49 |
| 5,698,128 | 12/1997 | Sakai et al. ............................. | 219/745 |
| 5,700,316 | 12/1997 | Pontes et al. ......................... | 106/31.58 |
| 5,777,023 | 7/1998 | Pavlin ..................................... | 524/590 |
| 5,881,648 | 3/1999 | Pavlin ..................................... | 101/491 |

*Primary Examiner*—Mark L. Bell
*Assistant Examiner*—Veronica F. Faison
*Attorney, Agent, or Firm*—E. D Palazzo

[57] ABSTRACT

An ink composition comprised of (1) a mixture comprised of a salt and an oxyalkylene compound wherein the conductive mixture possesses a melting point of from about 60° C. to about 120° C.; (2) an ink vehicle compound with a melting point of from about 80° C. to about 100° C.; (3) a viscosity modifying amide compound; (4) a lightfastness component; (5) a lightfastness antioxidant; and (6) a colorant.

55 Claims, No Drawings

INK COMPOSITIONS

REFERENCE TO COPENDING PATENT APPLICATIONS AND PATENTS

Inks are illustrated in U.S. Pat. Nos. 5,931,955; 5,902, 390; 5,876,492 and 5,922,117, and U.S. Ser. No. 933,914; U.S. Ser. No. 09/281,571, U.S. Ser. No. 09/281,540, U.S. Ser. No. 09/281,682, U.S. Ser. No. 09/300,331, U.S. Ser. No. 09/300,193, U.S. Ser. No. 09/300,373, U.S. Ser. No. 09/300, 210, U.S. Ser. No. 09/300,333, and U.S. Ser. No. 09/300, 298, the disclosures of each being totally incorporated herein by reference.

BACKGROUND OF THE INVENTION

The present invention is directed to ink compositions and, more specifically, the present invention relates to conductive inks which have the capability or quality of transmitting electrical signals generated by electric field assisted acoustic ink jet printing processes and apparatuses, resulting in, for example, controlled ink jettability which in turn can improve the edge raggedness of the images. The conductivity of a material can be measured in terms of the reciprocal of resistivity, which is the capacity for electrical resistance. The conductivity values of the invention inks expressed as log(pico.mho/cm) and recited herein were measured under melt conditions at about 150° C. by placing an aluminum electrode in the molten ink and reading the resistivity output on a GenRad 1689 precision RLC Digibridge at a frequency of 1 K.Hz. Conductivity expressed in terms of [log (pico.mho/cm)] is calculated from the reciprocal of resistivity. Generally, the invention inks possess conductivity values in the range of from about 2 to about 9 log(picomho/cm), and preferably from about 6 to about 8.5 log(picomho/cm), with a melting point of about 60° C. to about 150° C., and preferably about 70° C. to about 90° C., and which inks are especially useful for electric field assisted acoustic ink jet printing with enhanced jettability, processes and apparatuses, reference, for example, U.S. Pat. No. 5,121, 141, U.S. Pat. No. 5,111,220, and U.S. Pat. No. 5,371,531, the disclosures of which are totally incorporated herein by reference, including especially acoustic ink processes, such as an acoustic ink printer for printing images on a record medium.

In acoustic ink printing, the printhead produces approximately 2.2 picoliter droplets by an acoustic energy process. The ink under these conditions should display a melt viscosity of about 5 to 10 centipoise or less at the jetting temperature. Furthermore, once the ink is jetted onto the paper, the ink image should be of excellent crease property, and should be nonsmearing, waterfast, of excellent transparency and excellent fix. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties such as a viscosity of 1 to about 10 centipoise at a temperature of from about 75° C. to about 165° C., and solidify or harden after jetting onto paper such that the ink displays a hardness value of from about 0.1 to about 0.5 millimeter utilizing a penetrometer according to the ASTM penetration method D1321.

The inks of the present invention in embodiments thereof can be considered a phase change ink, that is, for example, an ink that changes, for example, the crystal structure of the ink components; a physico-chemical process that is, for example, more physical rather than chemical, from a liquid state to solid state in a suitable period of time, for example, from about 1 to about 100 milliseconds, and preferably in less than about 10, such as from about 2 to about 7 milliseconds; and which inks contain (1) a conductive mixture of an inorganic or an organic salt and an oxyalkylene compound having a melting point of lower than about 120° C., and preferably between about 75° C. to about 100° C., and with a low acoustic loss value of below about 100 dB/mm; (2) an ink vehicle that, for example, can fill the pores of the paper and which vehicles possess a melting point of between about 80° C. to about 120° C., and preferably between about 80° C. to about 100° C., with low acoustic loss, which enables a reduction, or minimization of energy consumption, and which acoustic loss is below, or about equal to 60 dB/mm; (3) a viscosity modifying compound that adjusts the viscosity of ink between, for example, about 5 to about 6 centipoise; (4) a lightfastness UV absorber; (5) a lightfastness antioxidant; (6) and a colorant such as a dye, a pigment or mixtures thereof.

More specifically, the present invention is directed to phase-change acoustic ink compositions comprised of (1) a conductive mixture of an organic salt such as urea sulfate or an inorganic salt such as potassium iodide and an oxyalkylene compound such as oxyalkylene bisamides like N,N'-propyleneoxy-propyleneoxy-propylene)-bis-stearamide; N,N'-propyleneoxy-propyleneoxy-propylene oxy-propylene-)-bis-stearamide; poly(alkyleneoxide) alkylates such as N,N'-(ethyleneoxy-ethyleneoxy-ethyleneoxy-ethyleneoxy-ethylene)-stearate; polyoxa-alkanedioate diesters such as distearyl-3,6,9-trioxaundecanedioate, with a preferred melting point of between about 75 and about 100° C., and a low acoustic loss and which acoustic loss is below about 100 dB/mm, and is preferably in the range of between 25 to about 80 dB/mm; (2) an ink vehicle such as a bisamide including N,N'-stearylene bis-stearamide; an oxazoline compound such as 2-stearyl-5-(hydroxymethyl)-5' (methoxy stearate) oxazoline; carbamate compounds such as tert-butyl carbamate (Aldrich #16,739-8) that, for example, can fill the pores of the paper and which vehicle possesses a melting point of between about 80° C. to about 120° C., and preferably between about 80° C. to about 100° C., with a low acoustic loss, which enables a reduction, or minimization of energy consumption, and which acoustic loss is below, or about equal to 60 dB/mm; (3) a viscosity modifying amide compound such as N,N'-hexamethylene bisacetamide, (Aldrich #22,423-5); N,N'-octamethylene-bis (dichloroacetamide), (Aldrich #14,750-8), that adjusts the viscosity of the ink to, for example, from about 5 to about 10 centipoise, and an acoustic loss in the range of between about 5 to about 40 dB/mm; (4) a UV absorber such as 2,2,6,6-tetramethyl-4-piperidinyl/β,β,β',β'-tetramethyl-3,9-(2,4,8,10-tetraoxo spiro(5,5)-undecane) diethyl]-1,2,3,4-butane tetracarboxylate; (5) an antioxidant such as antimony dialkyl phosphorodithioate; and (6) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness, for example between about 90 to about 100 percent, and superior waterfastness between about 95 to about 100 percent values. Moreover, in embodiments of the present invention there is enabled the elimination, or minimization of undesirable paper curl since water need not be present, or minimum amounts less than 1 percent of water may be selected in embodiments, and it is preferred in embodiments that there be an absence of water. When water is not present in the inks, a dryer can be avoided thereby minimizing the cost of the acoustic ink jet apparatus and process.

PRIOR ART

U.S. Pat. No. 5,286,288 discloses a hot melt ink composition for se in continuous ink jet printing comprising an electrolyte, an electrolyte-solvating and dissociating compound and an image-forming agent, the ink being solid at about 25° C., the ink being liquefying at a temperature between about 75° C. and about 175° C., and the ink in the liquid stage having a conductivity of greater than about 100 microsiemens/cm [8[log(pico.mho/cm)].

The use of quaternary ammonium compounds as conductivity enhancing agents in nonpolar liquid electrostatic developers is known, reference, for example, U.S. Pat. No. 3,985,663 which discloses conductive inks containing quaternary ammonium compounds. U.S. Pat. No. 5,382,492 discloses quaternary ammonium compounds as charge adjuvants for positive electrostatic liquid developers containing (A) a nonpolar liquid having a Kauri-butanol value of less than 30, present in a major amount; (B) thermoplastic resin particles having dispersed therein a quaternary ammonium compound which is substantially insoluble in the nonpolar liquid; and (C) a nonpolar liquid soluble ionic or zwitterionic charge director compound. The conductive inks of this patent contain thermoplastic resins which can increase the viscosity of inks above, for example 20 to 25 centipoise at the jetting temperatures of acoustic ink jet printing.

The use of mineral acid salts or organic acid salts in aqueous polar inks are known, reference, for example, U.S. Pat. No. 5,518,534 which discloses an ink set and process for alleviating bleed employing a first ink and a second ink, each containing an aqueous carrier medium and a colorant; the colorant in the first ink being a pigment dispersion and the second ink containing a salt of an organic acid or mineral acid having a solubility of at least 10 percent in 100 percent of water at 25° C.

U.S. Pat. No. 5,531,818 discloses a thermal ink jet printing process which comprises (a) incorporating into a thermal ink jet printer an ink composition comprising water, a dye, and pigment particles chemically bonded to the surfaces thereof a hydrophilic moiety selected from the group consisting of sulfonic acid salts, phosphoric acid salts, carboxylic acid salts, and mixtures thereof, and (b) causing droplets of the ink to be ejected in an imagewise pattern onto a recording medium by selectively heating the ink in the printer in an imagewise pattern, thereby generating images on the recording medium. The aqueous inks of this prior art are believed to be about 10 times more conductive than the inks of the present invention, and the inks of this prior art possess a number of disadvantages in that the ink has a tendency to soak into a plain paper medium, and this is avoided or minimized with the inks of the present invention in embodiments. The soaking blurs the print or thins out the print locally thereby adversely affecting print quality.

Ink jet printing processes that employ inks that are solid at room temperature and liquid at elevated temperatures are known, reference for example, U.S. Pat. No. 4,490,731, the disclosure of which is totally incorporated herein by reference, and which patent discloses an apparatus for dispensing certain solid inks for printing on a substrate such as paper.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of phase-change ink is its ability to print on plain paper since the phase-change ink quickly solidifies as it cools, and since it is waxy in nature, does not normally soak into a paper medium. However, phase-change ink jet system can be cumbersome in structure and in design, that is, the associated integrated electronics of a thermal ink jet head are considerably more compact than those of a phase-change ink jet head.

U.S. Pat. No. 4,751,528, the disclosure of which is totally incorporated herein by reference, discloses a phase-change ink jet which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase-change ink in a selected zone more rapidly to avoid offset by a pinch roll coming in contact with the surface of the substrate to which phase-change ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate inserted within an essentially nonheat conducting reservoir housing.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, it disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses ink jet ink, which phase-changes at room temperature. The inks of this patent can comprise vehicles, such as acids, aldehydes and mixtures thereof, which phase-change at temperatures between about 20° C. and about 45° C. The ink is impulse jetted at an elevated temperature in the range of about 45° C. to about 110° C., at which temperature the ink has a viscosity of about 10 to 15 centipoise.

U.S. Pat. No. 4,853,036 and U.S. Pat. No. 5,124,718 disclose an ink for ink jet recording which comprises a liquid composition essentially comprising a coloring matter, a volatile solvent with a vapor pressure of 1 millimeter Hg or more at 25° C., and a compound being solid at room temperature with a molecular weight of 300 or more.

U.S. Pat. No. 5,667,568 discloses an ink composition comprised of a colorant and a bisamide with a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,698,128 discloses an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly (oxyalkylene)-alkylate, a poly(oxyalkylene)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

The inks of U.S. Pat. No. 5,667,568, based on blends of N'-dodecylbis-stearamide, 95 percent by weight and a colorant, 5 percent by weight and inks of the prior art U.S. Pat. No. 5,698,128 derived from blends of the reaction product of an anhydride and an organoamine, 95 percent by weight and a colorant, 5 percent by weight have generally viscosities in the range of about 10 to about 15 centipoise and conductivity values in the range of 3.5 to 4.5 log (picomho/cm) compared to preferred viscosities of about 5 to 5.5 centipoise and conductivity values of from about 6.4 to about 7.0 [log(pico.mho/cm)] each at a temperature of from about 125° C. to about 165° C. The advantage of the lower viscosity and high 7.0 [log(pico.mho/cm)] conductivity inks resides in reduced power consumption by about 35 percent thereby enabling increased printing speed of from about 25 pages per minute to about 40 pages per minute, improved jettability, that is for example the drop size of the ink is uniform all across the printhead leading to better ink directionality (the velocity of the ink drops has a standard deviation value of between 3 to 5 microns and consequently lower edge raggedness of the prints such as a value of 5 microns, and preferably lower than 3 microns). The edge raggedness is the deviation of the average width of a line measured from the middle of the line to the edge of the line [also known as mid-frequency line-edge noise (MFLN)] and can be measured with an optical microscope.

SUMMARY OF THE INVENTION

While the known ink compositions and processes may be suitable for their intended purposes, a need remains for acoustic phase-change conductive ink compositions suitable for electric field assisted ink jet printing. In addition, there is a need for phase-change conductive ink compositions, which are compatible with a wide variety of plain papers and yield photographic quality images on plain and coated papers. Further, there is a need for phase-change ink compositions, which generate high quality, lightfast, and waterfast images on plain papers. There is also a need for phase-change ink jet ink compositions which generate high quality, fast-drying images on a wide variety of plain papers at low cost with high quality text and high quality graphics, and wherein the dye can be retained on the paper surface while the ink vehicle can continue to spread within the paper structure. Further, there is a need for phase-change ink jet ink compositions, which exhibit minimal or no feathering. Additionally, there is a need for ink jet ink compositions, which exhibit minimal intercolor bleed. There is also a need for phase-change ink jet ink compositions, which exhibit excellent image permanence. Further, there is a need for phase-change ink jet ink compositions, which are suitable for use in acoustic ink jet printing processes. Additionally, there is a need for phase-change hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. There is also a need for the phase-change inks wherein the spherulite (spherical ink crystals) size during solidification can be reduced from about 6 to about 9 micrometers to about 1 to about 4 micrometers, and preferably from about 1 to about 2 micrometers by, for example, the addition of crystallinity inhibitor diluents derived from low viscosity amide compounds to improve projection efficiency and crease resistance. These and other needs can be achievable with the inks of the present invention in embodiments thereof.

DETAILED DESCRIPTION OF THE INVENTION

Aspects of the present invention relate to an ink composition comprised of (1) a mixture comprised of a salt and an oxyalkylene compound including alkylene oxide oxyalkylene, and wherein the mixture is preferably conductive and possesses a melting point of, for example, from about 60° C. to about 120° C.; (2) a solid ink vehicle compound with, for example, a melting point of from about 80° C. to about 100° C.; (3) an amide compound, which primarily functions to control, or change the ink viscosity; (4) a lightfastness component; (5) a lightfastness antioxidant; and (6) a colorant; an ink composition wherein (1) the mixture (1) possesses an acoustic-loss value of, for example (for ranges, for example is intended throughout) from about 25 to about 80 dB/mm; (2) the ink vehicle compound, preferably a solid, possesses an acoustic-loss value of from about 15 to about 60 dB/mm; (3) the amide compound possesses an acoustic-loss value of from about 5 to about 40 dB/mm, an ink which yields images with crease values of from about 4 to about 8, haze values of from about 7 to about 10, gloss values of from about 85 to about 90, and which ink possesses an acoustic-loss value of from about 10 to about 80 dB/mm, a viscosity of from about 1 centipoise to about 15 centipoise at a temperature of from about 125° C. to about 165° C., and a conductivity of from about 6 to about 8 [log(pico.mho/cm); an ink composition wherein the mixture (1) possesses a melting point of from about 75° C. to about 100° C. and is present in an amount of from about 1 to about 59 percent by weight, the ink vehicle compound possesses a melting point of from about 80° C. to about 100° C. and is present in an amount of from about 69 to about 0.5 percent by weight, the amide compound is present in an amount of from about 29 to about 0.5 percent by weight, the lightfastness component is present in an amount of from about 0.25 to about 10 percent by weight, the antioxidant is present in an amount of from about 0.25 to about 10 percent by weight, and the colorant is present in an amount of from about 0.5 to about 20 percent by weight, and wherein the total amount of all of the ink components is about 100 percent; an ink composition wherein the salt contained in the mixture (1) is an inorganic salt selected from the group consisting of (1) potassium bromide; (2) potassium iodide; (3) lithium bromide; (4) sodium iodide; (5) zinc chloride hexahydrate; (6) magnesium chloride hexahydrate; (7) magnesium nitrate hexahydrate; (8) calcium nitrate tetrahydrate; (9) strontium chloride hexahydrate, and (10) magnesium acetate tetrahydrate, and which salt is present in the ink composition in an amount of from about 0.25 percent by weight to about 45 percent by weight; an ink wherein the salt is present in an amount of from about 0.75 percent by weight to about 25 percent by weight, or from about 10 percent by weight to about 20 percent by weight; an ink composition wherein in the salt is an organic salt selected from the group consisting of (1) D-lactic acid lithium salt; (2) D-gluconic acid potassium salt; (3) pantothenic acid sodium salt; (4) citric acid disodium salt; (5) 1-dodecane sulfonic acid sodium salt; (6) pantothenic acid calcium salt monohydrate; (7) tricalcium dicitrate tetrahydrate; (8) undecylenic acid zinc salt; (9) urea phosphate, and (10) urea sulfate, and which salt is present in the ink composition in an amount of from about 0.25 percent by weight to about 45 percent by weight; an ink wherein the salt is present in an amount of from about 10 percent by weight to about 20 percent by weight; an ink composition wherein in the oxyalkylene is an amide selected from the group consisting of (1) N,N'-(ethyleneoxy-ethyleneoxy-ethylene)-bis-stearamide; (2) N,N'-(ethyleneoxy-ethyleneoxy-ethylene oxy-ethylene)-bis-stearamide; (3) N,N'-(ethyleneoxy-ethyleneoxy-ethyleneoxy-ethyleneoxy-ethylene)-bis-stearamide; (4) N,N'-(propyleneoxy-propyleneoxy-propylene)-bis-stearamide; (5) N,N'-propylene oxy-propyleneoxy-propyleneoxy-propylene-)-bis-stearamide, and (6) N,N'-propyleneoxy-propyleneoxy-propyleneoxy-propyleneoxy-propylene)-bis-stearamide; an ink composition wherein the alkylene oxide is present in an amount of from about 0.25 to about 45 weight percent, or in an amount of from about 1 to about 25 weight percent; an ink composition wherein in the oxyalkylene compound is a poly (oxyalkylene)-alkylate selected from the group consisting of (1) N,N'-propyleneoxy-propyleneoxy-propyleneoxy-propyleneoxy-propylene)-acetate; (2) N,N'-(ethyleneoxy-ethyleneoxy-ethylene)-stearate; (3) N,N'-(ethyleneoxy-ethyleneoxy-ethyleneoxy-ethyleneoxy-ethylene)-stearate; (4) N,N'-(propyleneoxy-propyleneoxy-propylene)-stearate; (5) N,N'-(ethyleneoxy-ethyleneoxy-ethylene)-laurate; (6) N,N'-(ethyleneoxy-ethyleneoxy-ethyleneoxy-ethyleneoxy-ethylene)-laurate; (7) N,N'-(propyleneoxy-propyleneoxy-propylene)-laurate; (8) N,N'-propyleneoxy-propyleneoxy-propyleneoxy-propylene)-laurate, and (9) N,N'-propyleneoxy-propyleneoxy-propyleneoxy-propyleneoxy-propylene)-laurate; an ink composition wherein the compound contained in the mixture (1) is present in an amount of from about 0.25 to about 45 weight percent, or alternately from about 0.75 to about 25 weight percent; an ink composition wherein in oxyalkylene compound is a poly(oxyalkylene)-dialkylate selected from the group consisting of (1) N,N'-(ethyleneoxy-ethylene oxy-ethylene)-diacetate; (2) N,N'-propyleneoxy-propyleneoxy-propyleneoxy-propylene)-diacetate; (3) N,N'-propyleneoxy-propyleneoxy-propyleneoxy-propyleneoxy-propylene)-diacetate; (4) N,N'-(ethyleneoxy-ethyleneoxy-ethylene)-distearate; (5) N,N'-(propyleneoxy-propyleneoxy-propylene)-distearate; (6) N,N'-propyleneoxy-propyleneoxy-propyleneoxy-propyleneoxy-propylene)-distearate; (7) N,N'-(ethyleneoxy-ethyleneoxy-ethyleneoxy-ethyleneoxy-ethylene)-dilaurate; (8) N,N'-(propyleneoxy-propyleneoxy-propylene)-dilaurate; (9) N,N'-propyleneoxy-propyleneoxy-propyleneoxy-propylene)-dilaurate, and (10) N,N'-propyleneoxy-propyleneoxy-propyleneoxy-propyleneoxy-propylene)-dilaurate; an ink composition wherein the compound contained in the mixture (1) is present in an amount of from about 0.25 to about 45 weight percent, or from about 0.75 to about 25 weight percent; an ink composition wherein in the compound in the mixture (1) is a polyoxa-alkanoate ester selected from the group consisting of (1) methyl 3,6-dioxaheptanoate; (2) butyl 3,6-dioxaheptanoate, heptyl 3,6-dioxaheptanoate; (3) octyl 3,6-dioxaheptanoate; (4) dodecyl 3,6-dioxaheptanoate; (5) stearyl 3,6-dioxaheptanoate; (6) ethyl 3,6,9-trioxadecanoate; (7) neopentyl 3,6,9-trioxadecanoate; (8) nonyl 3,6,9-trioxadecanoate; (9) decyl 3,6,9-trioxadecanoate, and (10) stearyl 3,6,9-trioxadecanoate; an ink composition wherein in the compound contained in the mixture (1) is a polyoxa-alkanoate diester selected from the group consisting of (1) dimethyl 3,6,9-trioxaundecanedioate; (2) diethyl 3,6,9-trioxaundecanedioate; (3) dipropyl 3,6,9-trioxaundecanedioate; (4) isopropyl 3,6,9-trioxaundecanedioate; (5) dibutyl 3,6,9-trioxaundecanedioate; (6) dihexyl 3,6,9-trioxaundecanedioate; (7) diheptyl 3,6,9-trioxaundecanedioate; (8) dioctyl 3,6,9-trioxaundecanedioate; (9) dinonyl 3,6,9-trioxaundecanedioate, and (10) didodecyl 3,6,9-trioxaundecanedioate, and which compound is optionally present in the ink composition in an amount of from about 0.25 percent by weight to about 45 percent by weight; an ink composition wherein the compound of (1) is present in an amount of from about 25 percent by weight to about 75 percent by weight, and the salt is present in an amount of from about 75 percent by weight to about 25 percent by weight, and wherein the total amount of these compounds contained in the mixture (1) is about 100 percent; an ink composition wherein in the ink vehicle is a bisamide selected from the group consisting of (1) N,N'-ethylene bis-stearamide; (2) N,N'-hexylene bis-stearamide; (3) N,N'-decylene bis-stearamide; (4) N,N'-dodecylene bis-stearamide; (5) N,N'-stearylene bis-stearamide; (6) butylene bis-lauramide; (7) N,N'-hexylene bis-lauramide; (8) N,N'-octylene bis-lauramide; (9) N,N'-dodecylene bis-lauramide, and (10) N,N'-stearylene bis-lauramide trioxaundecanedioate, and which bisamide is optionally present in the ink in an amount of about 0.5 percent by weight to about 69 percent by weight, and preferably between about 5 percent by weight to about 62 percent by weight, and more preferably between about 10 percent by weight to about 30 percent by weight per 100 percent by weight of the ink; an ink composition wherein in the ink vehicle is 2-stearyl-5-(hydroxymethyl)-5'(methoxy stearate) oxazoline, and which vehicle is present in the ink composition in an amount of about 0.5 percent by weight to about 69 percent by weight, and preferably between about 5 percent by weight to about 62 percent by weight, and more preferably between about 10 percent by weight to about 30 percent by weight per 100 percent by weight of the ink; an ink composition wherein the vehicle is present in an amount of from about 0.5 to about 69 weight percent; an ink composition wherein in the ink vehicle is a carbamate selected from the group consisting of (1) tert-butyl carbamate; (2) benzyl carbamate; (3) benzyl N-hydroxycarbamate; (4) 4,4'-methylene-bis(dibutyldithio carbamate); (5) benzyl (S)-(–)-tetrahydro-5-oxo-3-furanyl carbamate; (6) diethyl dithiocarbamic acid, sodium salt, trihydrate, and which carbamate is optionally present in the ink composition in an amount of about 0.5 percent by weight to about 69 percent by weight, and preferably between about 5 percent by weight to about 62 percent by weight, and more preferably between about 10 percent by weight to about 30 percent by weight per 100 percent by weight of the ink; an ink composition wherein the viscosity modifying amide compound is selected from the group consisting of (1) iodoacetamide; (2) isobutyramide; (3) hexanoamide; (4) N,N'-hexamethylene bisacetamide; (5) erucamide; (6) octadecanamide; (7) N-(4-hydroxyphenyl)stearamide; (8) N-methylnicotineamide; (9) 4-acetamido-2,2,6,6-tetramethylpiperadine, and (10) N,N'-octamethylene-bis (dichloroacetamide), and which amide is optionally present in an amount of about 0.5 percent by weight to about 29 percent by weight, preferably between 5 percent by weight to about 25 percent by weight, and more preferably between 10 percent by weight to about 20 percent by weight per 100 percent by weight of ink; an ink composition wherein the lightfastness component is selected from the group consisting of (1) 1,1-(1,2-ethane-diyl)bis(3,3,5,5-tetramethyl piperazinone); (2) 2,2,4-trimethyl-1,2-hydro quinoline; (3) 2-(4-benzoyl-3-hydroxyphenoxy)ethylacrylate; (4) 2-dodecyl-N-(1,2,2,6,6-pentamethyl-4-piperidinyl) succinimide; (5) 2,2,6,6-tetramethyl-4-piperidinyl/β,β,β',β'-tetramethyl-3,9-(2,4,8,10-tetraoxospiro(5,5)-undecane) diethyl]-1,2,3,4-butane tetracarboxylate, and which component is optionally present in an amount of from about 0.25 percent by weight to about 10 percent by weight, and preferably from about 1 percent by weight to about 5 percent by weight per 100 percent by weight of ink; an ink composition wherein the lightfastness antioxidant is selected from the group consisting of (1) antimony dialkyl phosphorodithioate; (2) molybdenum oxysulfide dithio carbamate; (3) (nickel-bis(o-ethyl(3,5-di-tert-butyl-4-hydroxybenzyl) phosphonate); (4) 4,4'-methylene-bis(dibutyldithio carbamate), and (5) tetra sodium-N-(1,2-dicarboxyethyl)-N-octadecyl sulfosuccinamate), and which antioxidant is present in an amount of from about 0.25 percent by weight to about 10 percent by weight, and preferably from about 1 percent by weight to about 5 percent by weight per 100 percent by weight of the ink; a printing process which comprises incorporating into an acoustic ink jet printer the ink of the present invention, and which ink is comprised of, for example, (1) a conductive mixture comprised of a salt and an oxyalkylene compound wherein this conductive mixture has a melting point of from about 60° C. to about 120° C.; (2) a solid ink vehicle compound with a melting point of about 80° C. to about 100° C.; (3) a viscosity modifying amide compound; (4) a lightfast UV absorber; (5) a lightfast antioxidant, and (6) a colorant, and which ink yields images with crease values of from about 4 to about 8, haze values of from about 7 to about 10, gloss values of from about 85 to about 90, and which ink possesses an acoustic-loss value of from about 10 to about 80 dB/mm, a viscosity of from about 1 centipoise to about 10 centipoise, and a conductivity of from about 6.4 to about 7.0 [log(pico.mho/cm)], and causing droplets of the ink to be ejected in imagewise pattern onto a substrate; a process which comprises (a) providing an acoustic ink printer having a pool of the liquid ink of the present invention with a free surface, and a printhead including at least one droplet ejector for radiating the free surface of the ink with focused acoustic radiation to eject individual droplets of ink therefrom on demand, the radiation being brought to focus with a finite waist diameter in a focal plane, and which ink is comprised of, for example, (1) a conductive mixture comprised of a salt and an alkylene oxide compound wherein this said conductive mixture has a melting point of from about 60° C. to about 120° C.; (2) a solid ink vehicle compound with a melting point of about 80° C. to about 100° C.; (3) a viscosity modifying amide compound; (4) a lightfast UV absorber; (5) a lightfast antioxidant, and (6) a colorant; and which ink yields images with crease values of from about 4 to about 8, haze values of from about 7 to about 10, gloss values of from about 85 to about 90, and which ink possesses an acoustic-loss value of from about 10 to about 80 dB/mm, a viscosity of from about 1 centipoise to about 10 centipoise at a temperature of from about 125° C. to about 165° C., and a conductivity of from about 6.4 to about 7.0 [log(pico.mho/cm)] and causing droplets of the ink to be ejected in imagewise pattern onto a substrate; an ink wherein the colorant is a pigment, or a dye present in an amount of from about 0.5 to about 20 percent by weight; an ink wherein the colorant is a pigment of carbon black; an ink wherein the colorant is cyan, magenta, yellow, black, or mixtures thereof; an ink composition wherein the mixture (1) is present in an amount of from about 1 to about 59 percent by weight, the salt is potassium iodide, magnesium nitrate hexahydrate, D-lactic acid lithium salt, dodecyl sulfate lithium salt, or oleic acid potassium salt, the oxyalkylene compound is selected from the group consisting of N,N'-(ethyleneoxy-ethyleneoxy-ethyleneoxy-ethyleneoxy-ethylene)-bis-stearamide, N,N'-(ethyleneoxy-ethyleneoxy-ethyleneoxy-ethyleneoxy-ethylene)-dilaurate, and stearyl 3,6,9-trioxadecanoate, the ink vehicle compound is present in an amount of from about 69 to about 0.5 percent by weight and is selected from the group consisting of N,N'-stearylene bis-stearamide, 2-stearyl-5-(hydroxymethyl)-5' (methoxy stearate) oxazoline, and tert-butyl carbamate, the amide compound is present in an amount of from about 29 to about 0.5 percent by weight, and is N,N'-hexamethylene bisacetamide, or erucamide, the lightfastness component is present in an amount of from about 0.25 to about 10 percent by weight and is 2-dodecyl-N-(2,2,6,6-tetramethyl-4-piperidinyl) succinimide, or [1,2,2,6,6-pentamethyl-4-piperidinyl/β,β,β',β'-tetramethyl-3,9-(2,4,8,10-tetraoxospiro (5,5) undecane) diethyl]-1,2,3,4-butane tetracarboxylate, the antioxidant is present in an amount of from about 0.25 to about 10 percent by weight and is tetra-sodium-N-(1,2-dicarboxyethyl)-N-octadecyl-sulfosuccinamate), or molybdenum oxysulfide dithiocarbamate, and the colorant is present in an amount of from about 0.5 to about 20 percent by weight, and wherein the total of all ink components is about 100 percent; an ink with a conductivity of from about 6.4 to about 8 [log(pico.mho/cm)], a viscosity of from about 1 centipoise to about 10 centipoise, and which ink yields images with crease values of about 4 to about 8, haze values of about 7 to about 10, and gloss values of about 85 to about 90; an ink with a conductivity of from 6.4 to about 7.0 [log(pico.mho/cm)], a viscosity of from about 1 centipoise to about 10 centipoise and an acoustic loss of from about 10 to about 80 dB/mm, and which ink yields images with crease values of about 4 to about 8, haze values of about 7 to about 10, and gloss values of about 85 to about 90; an ink composition wherein in the conductive mixture (1) the salt is potassium iodide; the compound (1) is N,N'-(ethylene oxy-ethyleneoxy-ethyleneoxy-ethyleneoxy-ethylene)-bis-stearamide; the ink vehicle compound is 2-stearyl-5-(hydroxymethyl)-5'(methoxy stearate) oxazoline; the viscosity modifier is N,N'-hexamethylene bisacetamide; the lightfastness is a UV absorber of 2-dodecyl-N-(2,2,6,6-tetramethyl-4-piperidinyl) succinimide; the antioxidant is tetra-sodium-N-(1,2-dicarboxyethyl)-N-octadecyl-sulfosuccinamate), and which ink possesses, for example, a conductivity of from about 6.7 to about 7 [log(pico.mho/cm)]; an ink composition and which ink contains no water; an ink composition, which is substantially free of water; an ink composition and which ink is conductive; an ink comprised of (1) a salt and an oxyalkylene; (2) an ink vehicle; (3) an amide; (4) a lightfastness compound; (5) an antioxidant; and (6) a colorant; an ink which is conductive and which ink contains no water; and phase-change acoustic ink compositions comprised of (1) a mixture, preferably conductive, of an organic salt such as urea sulfate or an inorganic salt such as potassium iodide and an oxyalkylene compound such as oxyalkylene bisamides like N,N'-propyleneoxy-propyleneoxy-propylene)-bis-stearamide; N,N'-propyleneoxy-propyleneoxy-propylene oxy-propylene-)-bis-stearamide; poly(alkyleneoxide) alkylates such as N,N'-(ethyleneoxy-ethyleneoxy-ethyleneoxy-ethyleneoxy-ethylene)-stearate, polyoxa-alkanedioate diester such as distearyl-3,6,9-trioxaundecanedioate, each with a melting point of between about 75° C. and about 100° C., and a low acoustic loss and which acoustic loss is equal to or below about 100 dB/mm, and preferably in the range of between about 25 to about 80 dB/mm; (2) an ink vehicle such as a bisamide including N,N'-stearylene bis-stearamide, an oxazoline compound such as 2-stearyl-5-(hydroxymethyl)-5' (methoxy stearate) oxazoline, carbamate compounds such as tert-butyl carbamate (Aldrich #16, 739-8) that, for example, can substantially fill or be contained in the pores of a substrate like paper wherein the vehicle possesses a melting point of between about 80° C. to about 120° C., and preferably between about 80° C. to about 100° C., and with low acoustic loss, which enables a reduction, or minimization of energy consumption, and which acoustic loss is below, or about equal to 60 dB/mm; (3) a viscosity modifying amide compound such as N,N'-hexamethylene bisacetamide, (Aldrich #22,423-5), N,N'-octamethylene-bis(dichloroacetamide), (Aldrich #14,750-8), that primarily functions to adjust the viscosity of ink to, for example, between about 5 to about 10 centipoise, and acoustic loss in the range of between 5 to about 40 dB/mm; (4) a lightfastness UV absorber such as 2,2,6,6-tetramethyl-4-piperidinyl/β,β,β',β'-tetramethyl-3,9-(2,4,8,10-tetraoxospiro(5,5)-undecane) diethyl]-1,2,3,4-butane tetra-carboxylate; (5) an antioxidant such as antimony dialkyl phosphorodithioate, and (6) a colorant such as a dye, a pigment or mixtures thereof.

The mixture, preferably conductive, of the organic salt or inorganic salt and the oxyalkylene, preferably an oxyalkylene containing oligomeric compound, is present, for example, in an amount of from about 1 percent by weight to about 59 percent by weight, the ink vehicle is present in an amount of, for example, from about 69 percent by weight to about 0.5 percent by weight, the viscosity adjusting compound with dB/mm is present in the ink composition in an amount of, for example, from about 29 percent by weight to about 0.5 percent by weight, the lightfastness compound is present, for example, in an amount of from about 0.25 percent by weight to about 10 percent by weight, the antioxidant is, for example, present in an amount of from about 0.25 percent by weight to about 10 percent by weight, and the colorant is, for example, present in an amount of from about 0.5 percent by weight to about 20 percent by weight.

The ink composition contains, for example, the following range amounts for components (1) to (6) [1+69+29+0.25+0.25+0.5=100] to [59+0.5+0.5+10.0+10.0+20.0=100], and the following preferred range amounts [15+62+20+1+1+1=100] to [45+5+15+10+10+15=100].

In preferred embodiments, the mixture of oxyalkylene containing compounds and the inorganic or organic salt is present in an amount of from about 15 percent by weight to about 45 percent by weight, the solid ink vehicle is present in an amount of from about 62 percent by weight to about 5 percent by weight, the viscosity adjusting compound is present in an amount of, for example, from about 20 percent by weight to about 15 percent by weight, the lightfastness component is present in an amount of from about 1 percent by weight to about 10 percent by weight, the antioxidant is present in an amount of from about 1 percent by weight to about 10 percent by weight, and the colorant is present in an amount of from about 1 percent by weight to about 15 percent by weight. These composition ranges, and the others indicated herein were established using a number of known techniques, such as a statistical design based on the analyses of the experimental data of viscosity at 150° C., jettability at 150° C., image quality (high optical density, low crease, high gloss), lightfast, and waterfast values of images generated with various ink compositions.

The inks of the present invention can yield images that are durable, for example with a crease less than or equal to about 60, for example from about 35 to about 55, and can withstand the pressures of paper-folding such that there is no loss of information. The procedure followed to measure crease on images printed with the inks of the present invention is similar to the procedure for the evaluation of xerographic images. The average width of the creased image due to pressure was obtained on colored and black solid area images printed on paper by (a) folding inwards the printed area of the image; (b) passing on the folded image a standard TEFLON coated copper roll 2 inches in width, 3 inches in outer diameter, 2.25 inches inner diameter and weighing 860 grams; (c) unfolding the paper and wiping the loose toner from the creased imaged surface with a cotton swab; (d) measuring the average width of the ink free creased area with an image analyzer.

The salt may be an organic salt, an inorganic salt, and the like, and may be a hydrated salt or a nonhydrated salt.

Suitable inorganic salt examples include salts of cations such as lithium, sodium, potassium, rubidium, cesium, beryllium, magnesium, calcium, barium, strontium, aluminum, titanium, vanadium, chromium, manganese, iron, cobalt, nickel, copper, zinc, silver, cadmium, tin, antimony, and of anions such as fluoride, chloride, bromide, iodide, sulfide, phosphate, hydrogen phosphate, dihydrogen phosphate, pyrophosphate, polyphosphate, sulfate, hydrogen sulfate (bisulfate), pyrosulfate, sulfite, hydrogen sulfite (bisulfite), pyrosulfite, thiosulfate, carbonate, hydrogen carbonate (bicarbonate), tetraborate, metaborate, nitrate, nitrite, and the like, as well as mixtures thereof.

Specific examples of inorganic salts include potassium iodide (Aldrich #22,194-5); lithium bromide, (Aldrich #30, 837-4); potassium bromide (Aldrich #24,341-8); potassium carbonate (Aldrich #20,961-9); potassium carbonate sesquihydrate (Aldrich #24,355-8); potassium chloride (Aldrich #20,800-0); potassium hexafluorophosphate, (Aldrich #20,091-3); potassium hexafluorosilicate (Aldrich #30,666-1); potassium hexafluoro titanate (Aldrich #30,838-2); potassium hexafluorozirconate (Aldrich #33,668-8); potassium hydrogen carbonate (Aldrich #23,720-5); potassium hydrogen sulfate (Aldrich #22,347-6); potassium pyrophosphate (Aldrich #32,243-1); potassium pyrosulfate (Aldrich #30,775-0); potassium sulfate (Aldrich #22,349-2); potassium sulfite (Aldrich #28,981-7); potassium tetrafluoroborate (Aldrich #27,895-5); potassium phosphate monobasic (Aldrich #34,241-6); potassium phosphate tribasic (Aldrich #34,076-6); potassium tetraborate tetrahydrate (Aldrich #28,979-5); sodium bisulfate (Aldrich #30,782-3); sodium bisulfate monohydrate (Aldrich #23,371-4); sodium ammonium hydrogen phosphate tetrahydrate (Aldrich #24,350-7); sodium bisulfite (Aldrich #24,397-3); sodium bromide (Aldrich #22,034-5); sodium carbonate (Aldrich #22,232-1); sodium chloride (Aldrich #31,016-6); sodium hexafluoro aluminate (Aldrich #30,549-9); sodium hexafluoro silicate (Aldrich #25,017-1); sodium hydrogen carbonate (Aldrich #34,094-4); sodium iodide (Aldrich #21,763-8); sodium iodide dihydrate (Aldrich #21,730-1); sodium pyrosulfite (Aldrich #25,555-6); sodium metaborate hydrate (Aldrich #22,870-2); sodium metasilicate (Aldrich #30,781-5); sodium nitrite (Aldrich #34,766-3); sodium perborate tetrahydrate (Aldrich #24,412-0); sodium phosphate monobasic (Aldrich #33,198-8); sodium phosphate monobasic mono hydrate (Aldrich #22,352-0); sodium sulfate (Aldrich #23,931-3); sodium sulfite (Aldrich #20,784-5); sodium tripolyphosphate (Aldrich #23,850-3); sodium trisilicate (Aldrich #35,864-9); sodium thiosultate pentahydrate (Aldrich #21,724-7); sodium pyrophosphate decahydrate (Aldrich #22,136-8); magnesium bromide hexahydrate (Aldrich #21,684-4); magnesium chloride hexahydrate (Aldrich #20,895-7); magnesium nitrate hexahydrate (Aldrich #23,717-5); magnesium sulfate heptahydrate (Aldrich #23,039-1); magnesium hydrogen phosphate trihydrate (Aldrich #34,075-8); magnesium carbonate magnesium hydroxide pentahydrate (Aldrich #22,766-8); aluminum sulfate hexadecahydrate (Aldrich #22,761-7); aluminum potassium sulfate dodecahydrate (Aldrich #23,708-6); calcium nitrate tetrahydrate (Aldrich #23,712-4); calcium sulfate dihydrate (Aldrich #25,554-8); strontium chloride hexahydrate (Aldrich #25,552-1); zinc chloride, (Aldrich #22,999-7); zinc nitrate hexahydrate (Aldrich #22,873-7); zinc sulfate heptahydrate (Aldrich #22,137-6), magnesium acetate tetrahydrate (Aldrich #22,976-8); zinc stearate (Aldrich #30,756-4), and the like. The inorganic salts of (1) potassium iodide; (2) strontium chloride hexahydrate (Aldrich #25,552-1); (3) magnesium nitrate hexahydrate; (4) magnesium chloride hexahydrate, are preferred in embodiments and are present in the ink composition in amounts of, for example, between about 0.25 percent by weight to about 45 percent by weight, preferably between about 0.75 percent by weight to about 25 percent by weight, and more preferably between about 10 percent by weight to about 20 percent by weight per 100 percent by weight of ink.

Specific examples of suitable organic salts, which are present in the ink composition in various amounts of, for example, between about 0.25 percent by weight to about 45 percent by weight, preferably between about 0.75 percent by weight to about 25 percent by weight, and more preferably between about 10 percent by weight to about 20 percent by weight per 100 percent by weight of ink, include acetic acid lithium salt dihydrate (Aldrich #21,319-5); D-lactic acid lithium salt (Aldrich #23,391-9); acetoacetic acid lithium salt (Aldrich #23,383-6); citric acid trilithium salt hydrate (Aldrich #21,320-9); dodecyl sulfate lithium salt (Aldrich #86,190-1); formic acid potassium salt HCOOK (Aldrich #29,445-4); acetic acid potassium salt (Aldrich #23,649-7); benzoic acid potassium salt (Aldrich #29,000-9); oleic acid potassium salt (Aldrich #29,124-2); 2,4-hexadienoic acid potassium salt (Aldrich #35,976-9); 2-ketoglutaric acid mono potassium salt (Aldrich #27,171-3); potassium oxalate monohydrate (Aldrich #22,342-5); L-tartaric acid dipotassium salt hydrate (Aldrich #28,994-9); D-gluconic acid potassium salt (Aldrich #86,037-9); potassium hydrogen phthalate (Aldrich #17,992-2); citric acid, tripotassium salt monohydrate (Aldrich #36,017-1); 4-sulfo benzoic acid potassium salt (Aldrich #31,063-8); 4-nitrophenyl sulfate potassium salt (Aldrich #85,649-5); 3,5-dimethyl cyclohexyl sulfate potassium salt (Aldrich #25,031-7); 1,3-benzene disulfonic acid dipotassium salt (Aldrich #B315-9); 2,5-dihydroxy-1,4-benzene disulfonic acid dipotassium salt (Aldrich #16,076-8); p-toluene thio sulfonic acid potassium salt (Aldrich #30,432-8); acetic acid sodium salt (Aldrich #22,987-3); propionic acid sodium salt (Aldrich #10,919-3); butyric acid sodium salt (Aldrich #30,341-0); octanoic acid sodium salt (Aldrich #26,939-5); palmitic acid sodium salt (Aldrich #28,690-7); formic acid sodium salt (Aldrich #10,760-3); benzoic acid sodium salt (Aldrich #10,916-9); 4-hydroxybutyric acid sodium salt (Aldrich #H2,222-1); 4-hydroxybenzyl formic acid sodium salt (Aldrich #26,058-4); D,L-2-hydroxy valeric acid sodium salt hydrate (Aldrich #21,998-3); D-gluconic acid sodium salt (Aldrich #18,633-3); 2,2-dichloropropionic acid sodium salt (Aldrich #29,115-3); 3-methyl-2-oxobutanoic acid sodium salt (Aldrich #19,899-4); 4-methyl- 2-oxopentanoic acid sodium salt (Aldrich #19,898-6); 2-keto butyric acid sodium salt monohydrate (Aldrich #28,636-2), (2-keto glutaric acid monosodium salt (Aldrich #27,170-5); pyruvic acid sodium salt (Aldrich #P7,622-5); 3-(trimethylsilyl) propionic acid sodium salt (Aldrich #18,033-5); linoleic acid sodium salt (Aldrich #28,643-5); pantothenic acid sodium salt (Aldrich #28,316-9); hippuric acid sodium salt hydrate (Aldrich #27,164-0); 4-amino benzoic acid sodium salt (Aldrich #85,291-0); 4-amino salicylic acid sodium salt dihydrate (Aldrich #85,654-1); phenoxy acetic acid sodium salt hemihydrate (Aldrich #19,422-0); oleic acid sodium salt (Aldrich #23,397-8); succinic acid disodium (Aldrich #22,473-1); dihydroxy tartaric acid disodium salt hydrate (Aldrich #16,342-2); terephthalic acid disodium salt hydrate (Aldrich #28,082-8); malonic acid disodium salt monohydrate (Aldrich #28,654-0); D,L-malic acid disodium salt hydrate (Aldrich #30,849-8); L-tartaric acid disodium salt dihydrate (Aldrich #22,872-9); 4,4'-dihydroxy azobenzene-3,3'-dicarboxylic acid disodium salt (Aldrich #32,680-1); iminodiacetic acid disodium salt monohydrate (Aldrich #I-120-0); ketomalonic acid monohydrate disodium salt (Aldrich #K220-8); fumaric acid disodium salt (Aldrich #23,456-7); maleic acid disodium salt monohydrate (Aldrich #23,457-5); citric acid disodium salt (Aldrich #35,908-4); epoxy succinic acid disodium salt (Aldrich #25,894-6); citric acid trisodium salt dihydrate (Aldrich #85,578-2); D,L-isocitric acid trisodium salt hydrate (Aldrich #22,008-6); nitrilo triacetic acid trisodium salt monohydrate (Aldrich #10,630-5); 1-butane sulfonic acid sodium salt (Aldrich #22,151-1); 1-pentane sulfonic acid sodium salt (Aldrich #22,153-8); 1-hexane sulfonic acid sodium salt (Aldrich #22,154-6); 1-heptane sulfonic acid sodium salt (Aldrich #22,155-4); 1-octane sulfonic acid sodium salt (Aldrich #22,156-2); 1-decane sulfonic acid sodium salt (Aldrich #22,157-0); 1-dodecane sulfonic acid sodium salt (Aldrich #10,643-7); 1-hexadecane sulfonic acid sodium salt (Aldrich #10,641-0); methyl sulfate sodium salt hydrate (Aldrich #31,818-3), octyl sulfate sodium salt (Aldrich #29,424-1); dodecyl sulfate sodium salt (Aldrich #86,201-0); tetradecyl sulfate sodium salt (Aldrich #29,393-8); octadecyl sulfate sodium salt (Aldrich #29,394-6); 4-acetyl benzene sulfonic acid sodium salt (Aldrich

15,892-5); benzene sulfonic acid sodium salt (Aldrich #14,728-1); 4-hydroxybenzene sulfonic acid sodium salt dihydrate (Aldrich #28,298-7); sulfanilic acid sodium salt hydrate (Aldrich #25,128-3); dodecyl benzene sulfonic acid sodium salt (Aldrich #28,995-7); 2-formyl benzene sulfonic acid sodium salt dihydrate (Aldrich #23,938-0); 3-nitrobenzene sulfonic acid sodium salt (Aldrich #N2,200-2); 4-octylbenzene sulfonic acid sodium salt dihydrate (Aldrich #28,748-2); cyclohexyl sulfamic acid sodium salt (Aldrich #13,830-4); diphenyl amine-4-sulfonic acid sodium salt (Aldrich #24,296-9); 2,4-dinitrobenzene sulfonic acid sodium salt (Aldrich #25,993-4); sodium xylene sulfonate (Aldrich #24,253-5); 3,5-dichloro-2-hydroxybenzene sulfonic acid sodium salt (Aldrich #23,882-1); 4-chloro-3-nitrobenzene sulfonic acid sodium salt (Aldrich #22,725-0); 3,5-dibromo sulfanilic acid sodium salt (Aldrich #26,814-3); 1,3-benzene disulfonic acid disodium salt (Aldrich #25,980-2); 4-amino-1-naphthalene sulfonic acid, sodium salt hydrate, 6,7-dihydroxy-2-naphthalene sulfonic acid sodium salt (Aldrich #21,896-0); 3,6-dihydroxy naphthalene-2,7-disulfonic acid disodium salt (Aldrich #23, 282-3); 4,5-dihydroxy naphthalene-2,7-disulfonic acid disodium salt dihydrate (Aldrich #21,327-6 and 12,622-5); 2,6-naphthalene disulfonic acid disodium salt (Aldrich #N60-5); 1,3,6-naphthalene trisulfonic acid trisodium salt hydrate (Aldrich #31,074-3); 3-amino-2,7-naphthalene disulfonic acid monosodium salt trihydrate (Aldrich #24,867-3); dioctyl sulfosuccinate sodium salt (Aldrich #D20,117-0); 2-chloroethane sulfonic acid sodium salt monohydrate (Aldrich #15,765-1); 3-chloro-2-hydroxy-1-propane sulfonic acid sodium salt hydrate (Aldrich #32,533-3); 2-methyl-2-propene-1-sulfonic acid sodium salt (Aldrich #18,608-2); vinyl sulfonic acid sodium salt (Aldrich #27, 841-6); 3-amino-1-propane sulfonic acid sodium salt dihydrate (Aldrich #A7,612-5); glycerol 2-phosphate disodium salt hydrate (Aldrich #25,129-1); α-D-glucose-1-phosphate disodium salt tetrahydrate (Aldrich #86,217-7); cytidine 5'-monophosphate disodium salt hydrate (Aldrich #85,795-5); pantothenic acid calcium salt monohydrate (Aldrich #29,185-4 and 25,972-1); D-gluconic acid calcium salt (Aldrich #22,764-1); 2keto-D-gluconic acid, hemicalcium salt dihydrate (Aldrich #28,638-9); 4-methyl-2-oxopentanoic acid calcium salt dihydrate (Aldrich #24,644-1); 3-methyl-2-oxobutanoic acid calcium salt dihydrate (Aldrich #24,643-3); calcium propionate (Aldrich #34,445-1); D,L-glyceric acid calcium salt hydrate (Aldrich #G,500-0); tricalcium dicitrate tetrahydrate (Aldrich #35,973-4); choline chloride phosphate calcium salt (Aldrich #25,045-7); calcium oxalate hydrate (Aldrich #28,984); D-gluconic acid magnesium salt (Aldrich #34,443-5); zinc acetate dihydrate (Aldrich #22,335-2); undecylenic acid, zinc salt, (Aldrich #32,958-4); lactic acid silver salt, (Aldrich #35, 975-0); urea phosphate, (Aldrich #29,282-6); urea sulfate (Aldrich #28,059-3). The organic salts of D-lactic acid lithium salt; D-gluconic acid potassium salt; pantothenic acid sodium salt; citric acid disodium salt; 1-dodecane sulfonic acid sodium salt; pantothenic acid calcium salt monohydrate; tricalcium dicitrate tetrahydrate, undecylenic acid zinc salt, magnesium acetate tetrahydrate, urea phosphate and zinc stearate are preferred with undecylenic acid zinc salt, magnesium acetate tetrahydrate, citric acid disodium salt being more preferred.

Examples of oxyalkylenes present in the ink composition in amounts of between 0.25 percent by weight to about 45 percent by weight, preferably between 0.75 percent by weight to about 25 percent by weight, and more preferably between 10 percent by weight to about 20 percent by weight, per 100 percent by weight of ink are:

(A) oxyalkylene bisamides as disclosed in U.S. Pat. No. 5,667,568, the disclosure of which is totally incorporated herein by reference, bisamide with, for example, a viscosity of from about 1 centipoise to about 20 centipoise at a temperature of from about 125° C. to about 185° C., which bisamide is selected from the group consisting of (a) N,N'-(ethyleneoxy-ethyleneoxy-ethylene)-bis-stearamide; (b) N,N'-(ethyleneoxy-ethyleneoxy-ethyleneoxy-ethylene)-bis-stearamide; (c) N,N'-(ethyleneoxy-ethyleneoxy-ethyleneoxy-ethyleneoxy-ethylene)-bis-stearamide; (d) N,N'-propyleneoxy-propyleneoxy-propylene)-bis-stearamide; (e) N,N'-propyleneoxy-propyleneoxy-propyleneoxy-propylene-)-bis-stearamide; (f) N,N'-propyleneoxy-propyleneoxy-propyleneoxy-propyleneoxy-propylene)-bis-stearamide. The preferred oxyalkylene amide is N,N'-(ethylene oxy-ethyleneoxy-ethyleneoxy-ethyleneoxy-ethylene)-bis-stearamide;

(B) poly(oxyalkylene)monoalkylates disclosed in U.S. Pat. No. 5,700,316, for example, of the formula ROCO—(R'—O)$_n$—R, such as (a) N,N'-(ethyleneoxy-ethyleneoxy-ethylene)-acetate; (b) N,N'-(ethyleneoxy-ethyleneoxy-ethyleneoxyethylene)-acetate; (c) N,N'-(ethyleneoxy-ethyleneoxy-ethyleneoxy-ethyleneoxy-ethylene)-acetate; (d) N,N'-(propyleneoxy-propyleneoxy-propylene)-acetate; (e) N,N'-propyleneoxy-propyleneoxy-propyleneoxy-propylene)-acetate; (f) N,N'-propyleneoxy-propyleneoxy-propyleneoxy-propylene)-acetate; (g) N,N'-(ethyleneoxy-ethyleneoxy-ethylene)-stearate; (h) N,N'-(ethyleneoxy-ethyleneoxy-ethyleneoxy-ethylene)-stearate; (i) N,N'-(ethyleneoxy-ethyleneoxy-ethyleneoxy-ethyleneoxy-ethylene)-stearate; (j) N,N'-(propyleneoxy-propylene oxy-propylene)-stearate; (k) N,N'-propyleneoxy-propyleneoxy-propyleneoxy-propylene)-stearate; (k) N,N'-propyleneoxy-propyleneoxy-propyleneoxy-propyleneoxy-propylene)-stearate; (m) N,N'-(ethyleneoxy-ethyleneoxy-ethylene)-laurate; (n) N,N'-(ethyleneoxy-ethyleneoxy-ethyleneoxy-ethylene)-laurate; (o) N,N'-(ethyleneoxy-ethyleneoxy-ethyleneoxy-ethyleneoxy-ethylene)-laurate; (p) N,N'-(propyleneoxy-propyleneoxy-propylene)-laurate; (q) N,N'-propyleneoxy-propyleneoxy-propyleneoxy-propylene)-laurate; (r) N,N'-propyleneoxy-propyleneoxy-propyleneoxy-propyleneoxy-propylene)-laurate. The preferred poly(oxyalkylene) monoalkylates include N,N'-(ethyleneoxy-ethyleneoxy-ethyleneoxy-ethyleneoxy-ethylene)-acetate, N,N'-propyleneoxy-propyleneoxy-propylene oxy-propyleneoxy-propylene)-stearate, N,N'-propyleneoxy-propyleneoxy-propyleneoxy-propyleneoxy-propylene)-laurate;

(C) poly(oxyalkylene)dialkylates of the formula ROCO—(R'—O)$_n$—OR, such as (a) N,N'-(ethyleneoxy-ethyleneoxy-ethylene)-diacetate; (b) N,N'-(ethylene oxy-ethyleneoxy-ethyleneoxy-ethylene)-diacetate; (c) N,N'-(ethyleneoxy-ethyleneoxy-ethyleneoxy-ethyleneoxy-ethylene)-diacetate; (d) N,N'-(propyleneoxy-propyleneoxy-propylene)-diacetate; (e) N,N'-propyleneoxy-propyleneoxy-propyleneoxy-propylene)-diacetate; (f) N,N'-propyleneoxy-propyleneoxy-propyleneoxy-propyleneoxy-propylene)-diacetate; (g) N,N'-(ethyleneoxy-ethyleneoxy-ethylene)-distearate; (h) N,N'-(ethyleneoxy-ethyleneoxy-ethyleneoxy-ethylene)- distearate; (i) N,N'-(ethyleneoxy-ethyleneoxy-ethyleneoxy-ethyleneoxy-ethylene)-distearate; (j) N,N'-(propyleneoxy-propyleneoxy-propylene)-distearate; (k) N,N'-propyleneoxy-propyleneoxy-propyleneoxy-propylene)-distearate; (l) N,N'-propyleneoxy-propyleneoxy-propyleneoxy-propyleneoxy-propylene)-distearate; (m) N,N'-(ethyleneoxy-ethyleneoxy-ethylene)-dilaurate; (n) N,N'-(ethyleneoxy-ethyleneoxy-ethyleneoxy-ethylene)-dilaurate; (o) N,N'-(ethyleneoxy-ethyleneoxy-ethyleneoxy-ethyleneoxy-ethylene)-dilaurate; (p) N,N'-(propyleneoxy-propyleneoxy-propylene)-dilaurate; (q) N,N'-propyleneoxy-propyleneoxy-propyleneoxy-propylene)-dilaurate; (r) N,N'-propyleneoxy-propyleneoxy-propyleneoxy-propyleneoxy-propylene)-dilaurate. The preferred poly(oxyalkylene)dialkylates include N,N'-(ethyleneoxy-ethylene oxy-ethyleneoxy-ethyleneoxy-ethylene)-diacetate, N,N'-propyleneoxy-propyleneoxy-propyleneoxy-propyleneoxy-propylene)-distearate, N,N'-propyleneoxy-propyleneoxy-propyleneoxy-propyleneoxy-propylene)-dilaurate;

(D) poly(oxyalkylene) esters disclosed in U.S. Pat. No. 5,700,316 such as polyoxa-alkanoate ester of the formula $ROOC-CH_2-(O-R')_n-OR$, such as (a) methyl-3,6-dioxaheptanoate; (b) ethyl-3,6-dioxaheptanoate; (c) propyl-3,6-dioxa heptanoate; (d) isopropyl-3,6-dioxaheptanoate; (e) butyl-3,6-dioxaheptanoate; (f) neopentyl-3,6-dioxaheptanoate; (g) hexyl-,6-dioxaheptanoate; (h) heptyl3,6-dioxaheptanoate; (i) octyl-3,6-dioxaheptanoate; (j) nonyl-3,6-dioxaheptanoate; (k) decyl-3,6-dioxaheptanoate; (l) dodecyl-3,6-dioxaheptanoate; (m) stearyl-3,6-dioxaheptanoate; (n) methyl-3,6,9-trioxadecanoate; (o) ethyl-3,6,9-trioxadecanoate; (p) propyl-3,6,9-trioxadecanoate; (q) isopropyl-3,6,9-trioxadecanoate; (r) butyl-3,6,9-trioxadecanoate; (s) neopentyl-3,6,9-trioxadecanoate; (t) hexyl-3,6,9-trioxadecanoate; (u) heptyl-3,6,9-trioxadecanoate; (v) octyl-3,6,9-trioxadecanoate; (w) nonyl-3,6,9-trioxadecanoate; (x) decyl-3,6,9-trioxadecanoate; (y) dodecyl-3,6,9-trioxadecanoate, and (z) stearyl-3,6,9-trioxadecanoate. The preferred poly(oxyalkylene) esters include neopentyl-3,6-dioxaheptanoate, dodecyl-3,6-dioxaheptanoate, and stearyl 3,6,9-trioxadecanoate; and (E) polyoxa-alkanedioate diester of the formula $ROOC-CH_2-(O-R')_n-O\ CH_2-COOR$, such as (a) dimethyl-3,6,9-trioxaundecanedioate; (b) diethyl-3,6,9-trioxaundecanedioate; (c) dipropyl-3,6,9-trioxaundecanedioate; (d) isopropyl-3,6,9-trioxaundecanedioate; (e) dibutyl-3,6,9-trioxaundecanedioate; (f) dineopentyl-3,6,9-trioxaundecanedioate; (g) dihexyl-3,6,9-trioxaundecanedioate; (h) diheptyl-3,6,9-trioxaundecanedioate; (i) dioctyl-3,6,9-trioxaundecanedioate; (j) dinonyl-3,6,9-trioxaundecanedioate; (k) didecyl-3,6,9-trioxaundecanedioate; (l) didodecyl-3,6,9-trioxaundecanedioate; (m) distearyl-3,6,9-trioxaundecanedioate. The preferred polyoxa-alkanedioate diesters include dineopentyl-3,6,9-trioxaundecanedioate, didecyl-3,6,9-trioxaundecanedioate, didodecyl-3,6,9-trioxaundecanedioate, distearyl-3,6,9-trioxaundecanedioate.

The mixture of the salt and the oxyalkylene compound is generally prepared by (a) dissolving a mixture of a salt and an oxyalkylene compound at about 25° C. to about 60° C. in a common known suitable solvent such as dichloromethane, alcohol, or water for a period of 30 minutes, followed by removal of the solvent by distillation under vacuum, or (b) melt blending between about 100° C. to about 150° C. the mixture of the salt and the oxyalkylene compound, stirring the molten mixture for a suitable period like 30 minutes, and cooling to about 25° C. In the mixture, the oxyalkylene compound is present in an amount of from about 25 percent by weight to about 75 percent by weight and the salt is present in an amount of from about 75 percent by weight to about 25 percent by weight, and wherein the total of these two components is about 100 percent.

A typical example of the mixture, preferably conductive in its characteristics, contains an adduct of a metal salt $[M^+X^-]$ with a melting point of greater than or equal to about 120° C., such as potassium iodide (MP 681° C.) or urea phosphate (MP 121° C.), and an oxyalkylene compound of the formula $RCONH-CH_2-[CHR'-O-CH_2]_a-CH_2-NH-CO-R$ such as a N,N'-(ethyleneoxy-ethyleneoxy-ethylene)-bis-stearamide prepared in a common solvent, such as ethano, to provide:

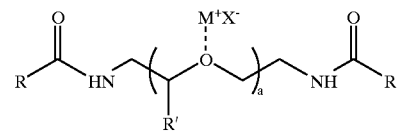

M = Li, Na, K, Rb, Cs, Be, Mg, Ca, Ba, Al, NR$_4$, P
X$^-$ = Cl, F, Br, I, SCN, OCN
R = Alkyl
R' = H or Alkyl
a = 2 to 8 wherein R is a hydrocarbon; R' is a hydrogen atom or a methyl group; M is an alkali metal such as sodium, lithium, potassium, cesium, beryllium, magnesium, calcium, barium; and X is a halide such as chlorine, bromine, iodide, or an isocyanate and wherein the bisamide possesses a molecular weight, $M_w$, of from about 200 to about 2,000 grams per mole, and more specifically, wherein M=Li, Na, K, Rb, Cs, Be, Mg, Ca, Ba, Al, NR$_4$, or P; X$^-$=Cl, F, Br, I, SCN, OCN; R=alkyl, R'=H or alkyl; and a=2 to 8.

Another example of a mixture contains an adduct of a metal salt $[M^+X^-]$ with a melting point less than or equal to about 120° C. such as magnesium nitrate hexahydrate (MP 89° C.) and an oxyalkylene compound with ethylene diamine tetrakis(propoxylate-block-ethoxylate)tetrol, (Aldrich #43,553-8) (MP 58° C.) is prepared by melt blending the two components at 100° C. and stirring the molten mixture for 30 minutes, and cooling it down to about 25° C.

The solid ink vehicle with, for example, an acoustic-loss value of from about 15 to about 60 dB/mm and present in the ink composition in an amount of, for example, from about 69 to about 0.5 percent by weight, preferably between about 5 percent by weight to about 62 percent by weight, and more preferably between about 10 percent by weight to about 30 percent by weight per 100 percent by weight of ink, is selected from the group consisting of:

(A) bisamide compounds of the structure RCONH—R'—NHOCR, where R is an alkyl of from about 2 to about 30 carbon atoms or aryl, R' is an alkylene with from about 2 to about 30 carbon atoms, as disclosed in U.S. Pat. No. 5,667,568. Examples of bisamides include (a) N,N'-ethylene bis-stearamide; (b) N,N'-propylene bis-stearamide; (c) N,N'-butylene bis-stearamide; (d) N,N'-hexylene bis-stearamide; (e) N,N'-heptylene bis-stearamide; (f) bis-stearamide; (g) N,N'-decylene bis-stearamide; (h) N,N'-dodecylene bis-stearamide; (l) N,N'-stearylene bis-stearamide; (j) N,N'-ethylene bis-lauramide; (k) N,N'-propylene bis-lauramide; (l) butylene bis-lauramide; (m) N,N'-hexylene bis-lauramide; (n) N,N'-heptylene bis-lauramide; (o) N,N'-octylene bis-lauramide; (p) N,N'-decylene bis-lauramide; (q) N,N'-dodecylene bis-lauramide; (r) N,N'-stearylene bis-lauramide. The preferred bisamide include N,N'-stearylene bis-stearamide, N,N'-stearylene bis-lauramide;

(B) an oxazoline compound such as 2-stearyl-5-(hydroxymethyl)-5' (methoxy stearate) oxazoline as disclosed in U.S. Pat. No. 5,698,017, the disclosure of which is totally incorporated herein by reference, and of the formula

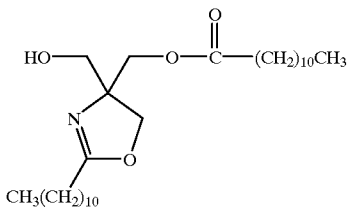

(C) carbamate compounds, such as those disclosed in U.S. Ser. No. 09/281,571, the disclosure of which is totally incorporated herein by reference, of (a) tert-butyl carbamate, (Aldrich #16,739-8); (b) tert-butyl-N-(tert-butoxycarbonyloxy) carbamate, (Aldrich #41,279-1); (c) tert-butyl-N-[2-hydroxy-2-(hydroxyphenyl)-1-methylethyl] carbamate, (Aldrich #40,429-2); (d) tert-butyl-(2,4-dinitrophenoxy) carbamate, (Aldrich #33, 305-0); (e) benzyl carbamate, (Alfa Organics #A11569); (f) benzyl N-hydroxycarbamate, (Aldrich #32,327-6); (g) ethyldiphenyl carbamate, (Aldrich #37, 291-9); (h) 2-chloroethyl carbamate, (Aldrich #40,429-2); (9) cyanomethyl-N,N-dimethyl dithiocarbamate, (Aldrich #28,054-2); (i) methyl 3-pyridylcarbamate, (Aldrich #28,113-1); (j) potassium N-hydroxy methyl-N-methyl-dithio carbamate (Busan 40, Buckman Laboratories Inc.); (k) sodium dimethyl dithiocarbamate; (l) disodium ethylenebis-dithio carbamate; (m) diethylammonium diethyldithio carbamate, (Alfa Organics #A10458); (n) benzyl(S)-(−)-tetrahydro-5-oxo-3-furanyl carbamate, (Aldrich #41,924-9); (o) diethyldithiocarbamic acid, ammonium salt, (Aldrich #35, 954-8); (p) diethyldithiocarbamic acid, diethyl ammonium salt, (Aldrich #31,811-6); (q) diethyidithiocarbamic acid, sodium salt, trihydrate, (Aldrich #22, 868-0). The preferred carbamates include tert-butyl carbamate, benzyl N-hydroxycarbamate, 4,4'-methylene-bis(dibutyldithio carbamate), benzyl(S)-(−)-tetrahydro-5-oxo-3-furanyl carbamate, diethyldithiocarbamic acid, sodium salt, trihydrate.

A viscosity adjusting compound that primarily retains the viscosity of the ink of for example, between from about 1 to about 20, and preferably from about 5 to about 7 centipoise at about 105° C. to about 165° C., with a melting point of, for example, between about 40° C. and about 140° C., an acoustic-loss value of from about 5 to about 40 dB/mm is present in the ink composition in an amount of, for example, from about 0.5 to about 30 percent by weight, is preferably an amide compound selected from the group consisting of (1) iodoacetamide, (Aldrich #I,670-9); (2) 2-bromoacetamide, (Aldrich #30,127-2); (3) propionamide, (Aldrich #14,393-6); (4) chloro propionamide, (Aldrich #12, 520-2), (Aldrich #19,239-2); (5) isobutyramide, (Aldrich #14,443-6); (6) hexano amide, (Aldrich #29,339-3); (7) N,N'-hexamethylene bisacetamide, (Aldrich #22,423-5); (8) N,N'-octamethylene-bis(dichloroacetamide), (Aldrich #14, 750-8); (9) 2,2-diethoxy acetamide, (Aldrich #37,045-2); (10) phenoxyacetamide, (Aldrich #40,497-7); (11) erucamide, (Aldrich #28,057-7); (12) octa decanamide, (Aldrich #O,60-1); (13) N-(4-hydroxyphenyl)stearamide, (Aldrich #38,548-4); (14) amino benzamide, (Aldrich #A8, 980-4), (Aldrich #25,301-4); (15) nipecotamide, (Aldrich #NB10-5); (16) N-methylnicotineamide, (Aldrich #M5,900-9); (17) Nα-(tert-butoxycarbonyl)-L-glutamine, (Aldrich #40,844-1); (18) lactamide, (Aldrich #29,292-3); (19) ethyl oxamate, (Aldrich #E4,320-9); (20) 4-acetamido-2,2,6,6-tetramethylpiperadine, (Aldrich #39,129-8); (21) N-isopropyl-1-piperazin acetamide, (Aldrich #22,092-2). The preferred amides include N,N'-hexamethylene bisacetamide, N,N'-octamethylene-bis (dichloro acetamide), hexanoamide, octadecanamide. The viscosity adjuster is present in the ink composition in amounts of between about 0.5 percent by weight to about 29 percent by weight, preferably between about 5 percent by weight to about 25 percent by weight, and more preferably between about 10 percent by weight to about 20 percent by weight per 100 percent by weight of ink.

The lightfastness components are preferably UV absorbers that primarily protect the developed images from UV degradation and this component is present in amounts of, for example, from about 0.25 percent by weight to about percent by weight and preferably from about 1 percent by weight to about 5 percent by weight, examples of which are (1) 1,1-(1,2-ethane-diyl)bis( 3,3,5,5-tetramethylpiperazinone), Goodrich Chemicals; (2) 2,2,4-trimethyl-1,2-hydroquinoline, Mobay Corporation; (3) 2-(4-benzoyl-3-hydroxy phenoxy)ethylacrylate; (4) 2-dodecyl-N-(1,2,2,6,6-pentamethyl-4-piperidinyl) succinimide, Aldrich Chemicals; (5) 2,2,6,6-tetramethyl-4-piperidinyl/β,β,β',β'-tetramethyl-3,9-(2,4,8,10-tetraoxo spiro(5,5)-undecane) diethyl]-1,2,3,4-butane tetracarboxylate.

The lightfast antioxidants of the ink compositions that primarily protect images from oxidation are present in amounts of from about 0.25 percent by weight to about 10 percent by weight, and preferably from about 1 percent by weight to about 5 percent by weight, include (1) antimony dialkyl phosphorodithioate; (2) molybdenum oxysulfide dithio carbamate, both available from Vanderbilt Corporation; (3) (nickel-bis(o-ethyl(3,5-di-tert-butyl-4-hydroxybenzyl) phosphonate, Ciba Geigy Corporation; (4) 4,4'-methylene-bis(dibutyidithio carbamate), Vanlube 7723, Vanderbilt Corporation; (5) tetra-sodium-N-(1,2-dicarboxyethyl)-N-octadecyl sulfosuccinamate, American Cyanamid Corporation.

Suitable colorants, present in an effective amount generally of from about 0.5 percent by weight to about 20, or from about 3 to about 12 percent by weight, include pigments and dyes, with solvent dyes being preferred. Any dye or pigment may be chosen, provided that it is capable of being dispersed or dissolved in the vehicle and is compatible with the other ink components. Colorants include pigments, dyes, mixtures thereof, mixtures of dyes, mixtures of pigments, and the like.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange), (Matheson, Colemen Bell); Sudan II (Orange), (Matheson, Colemen Bell); Sudan Orange G (Aldrich #), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical Company).

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling compounds of the present application. Examples of suitable spirit solvent dyes include: Neozapon Red 492 (BASF); Orasol Red G (Ciba-Geigy); Direct Brilliant Pink B (Crompton-Knolls); Aizen Spilon Red C- BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 [C.I. Solvent Black, C.I. #12195] (BASF); Sudan Blue 670 [C.I. #61554] (BASF); Sudan yellow 146 [C.I. #12700] (BASF); Sudan Red 462 [C.I. #26050] (BASF) are preferred.

The inks of the present invention can be prepared by any suitable method. A colored phase-change ink composition was prepared by mixing 45 percent by weight of the mixture having an acoustic-loss value of less than about 80 dB/mm and a melting point of point of between about 75° C. to about 120° C.; 20 percent by weight of the ink vehicle compound having a melting point of between about 80° C. to about 100° C.; 20 percent by weight of the viscosity modifying amide compound; 5 percent by weight of a lighfast UV absorber; 5 percent by weight of lightfast antioxidant and 5 percent by weight of a colorant. The mixture was heated to a temperature of about 120° C. and stirred for a period of about 60 minutes until it formed a homogeneous solution, and subsequently was cooled to 25° C.

The inks of the present invention are particularly suitable for printing processes wherein the substrate, such as paper, transparency material, or the like, is heated during the printing process to facilitate formation of the liquid crystalline phase within the ink. When transparency substrates are employed, temperatures typically are limited to a maximum of about 100° C. to about 110° C., since the polyester typically employed, as the base sheet in transparency sheets, tends to deform at higher temperatures. Specially formulated transparencies and paper substrates can, however, tolerate higher temperatures, and frequently are suitable for exposure to temperatures of about 150° C. or even 200° C. in some instances. Typical heating temperatures are from about 40° C. to about 140° C., and preferably from about 60° C. to about 95° C., although the temperature can be outside these ranges.

More specifically, the inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers has suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively mixture images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing; (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single print head launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Acoustic-loss measurements recited herein were measured as follows: samples, about 5 grams of the components being measured, were placed between the two transducers, with the temperature set at 150° C. The samples were allowed to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same material were measured. The attenuation dB/mm was then calculated by ratioing the amplitude values obtained at different separation distances.

The ink optical density values of, for example, 2.65 Black [Neozapon Black X51, C.I. #12195]; 1.95 (Magenta), [Sudan Red 462, C.I. #26050]; 2.05 (Cyan) [Sudan Blue 670, C.I. #61554]; 1.45 Yellow [Sudan Yellow 146, C.I. #12700], recited herein were obtained on a Pacific Spectrograph Color System. The system comprises two major components, an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information The lightfastness values of varying ink jet images, which values were, for example, between 90 to 100 percent, and preferably between 95 to 100 percent, were measured in the Mark V Lightfast Tester obtained from Microscal Company, London, England.

The waterfast values of the above ink jet images, which for example were between about 90 to about 100 percent, and preferably between about 95 to about 100 percent, were obtained from the optical density data recorded before and after washing with water at about 25° C. for five minutes.

The viscosity values were measured at about 150° C. with a Stress Rheometer from Cari-Med model CSL 100. All experiments were performed at a shear rate of 1,250 s$^{-1}$. The advantage of low viscosity inks resides in reduced power consumption by about 35 percent, thereby increased printing speed from about 25 pages per minute to about 40 pages per minute, improved jettability leading to better ink directionality and consequently lower edge raggedness of the prints, such as a value of about 5 microns, and preferably lower than about 3 microns. The edge raggedness refers to the deviation of the average width of a line measured from the middle of the line to the edge of the line [also known as mid-frequency line-edge noise (MFLN)] and can be measured with an optical microscope.

The average width of the creased image due to pressure was obtained on colored and black solid area images printed on paper by (a) folding inwards the printed area of the image; (b) passing on the folded image a standard TEFLON coated copper roll 2 inches in width, 3 inches in outer diameter, 2.25 inches in inner diameter and weighing 860 grams; (c) unfolding the paper and wiping the loose toner from the creased imaged surface with a cotton swab, and (d) measuring the average width of the toner free creased area with an image analyzer.

The conductivity values expressed as log(picomho/cm) and recited herein were measured under melt conditions at about 150° C. by placing an aluminum electrode in the melt and reading the resistivity output on a GenRad 1689 precision RLC Digibridge at a frequency of 1 K.Hz. Conductivity is calculated from the resistivity data.

The haze values of images between about 10 to about 30, and preferably between about 10 to about 20, recited herein were measured on images printed on uncoated polyester such as MYLAR® with a Haze meter XL-211, HAZE-GARD® System obtained from Pacific Scientific Company.

Specific embodiments of the invention will now be described in detail. These examples are intended to be illustrative, and the invention is not limited to the materials, conditions, or process parameters set forth in these embodiments. All percent and percentages are by weight unless otherwise indicated.

EXAMPLE I

The potassium iodide salt of N,N'-(ethylene oxyethylene oxyethylene)-bis-(stearamide) was prepared from stearic acid, JEFFAMINE 192™ and potassium iodide as follows:

A 300 milliliter Parr reactor equipped with a mechanical stirrer and a distillation apparatus was charged with 284 grams of stearic acid and 96 grams of N,N'-(ethyleneoxyethyleneoxyethylene)-diamine available as JEFFAMINE 148™ from Huntsman Corporation. The mixture was then heated to 165° C. over a 2 hour period, followed by increasing the temperature to 185° C. over a 1 hour period. The pressure was then reduced from atmospheric pressure to 40 millimeters Hg, and these conditions were maintained for an additional 2 hours, wherein the total amount of water collected in the distillation receiver was measured to be about 17 milliliters. The pressure was then increased to atmospheric pressure and the product poured into a metal container and left undisturbed to cool down to room temperature, about 25° C. to about 35° C. throughout.

100 Grams of the above product were then dissolved in 300 grams of methanol with stirring at about 45° C. To this was then added 10 mole percent of potassium iodide (1.44 grams), and the mixture resulting was allowed to stir at room temperature. The product, crystallized out, was filtered and washed repeatedly with water. The product displayed a melting point of about 114° C. as measured by a differential scanning calorimeter, a viscosity of 6.9 centipoise at 150° C., and a conductivity of 6.8 log(picomho/cm).

EXAMPLE II

The potassium iodide salt of N,N'-poly(propyleneoxy)-bis-(stearamide) was prepared from stearic acid, JEFFAMINE D230™ and potassium iodide as follows:

A 300 milliliter Parr reactor equipped with a mechanical stirrer and a distillation apparatus was charged with 284 grams of stearic acid and 115 grams of poly(propyleneoxy)-diamine available as JEFFAMINE D$_{230}$™ from Huntsman Corporation. The mixture was then heated to 165° C. over a 2 hour period, followed by increasing the temperature to 1850C over a 1 hour period. The pressure was then reduced from atmospheric pressure to 40 millimeters Hg, and these conditions maintained for an additional 2 hours, wherein the total amount of water collected in the distillation receiver was measured to be about 17 milliliters. The pressure was then increased to atmospheric pressure and the product poured into a metal container and left undisturbed to cool down to room temperature, about 25° C. to about 35° C. throughout.

100 Grams of the above product were then dissolved in 300 grams of methanol with stirring at about 45° C. To this was then added 10 mole percent of potassium iodide (1.35 grams), and the mixture left stirring at room temperature, about 25° C. throughout. The product, crystallized out, was filtered and washed repeatedly with water. The product displayed a melting point of about 60° C., a viscosity of 7.1 centipoise at 150° C., and a conductivity of 7.0 log(picomho/cm) at 150° C.

EXAMPLE III

The potassium iodide salt of N,N'-poly(propyleneoxy)-bis-(stearamide) was prepared from stearic acid, JEFFAMINE D400™ and potassium iodide as follows:

A 300 milliliter Parr reactor equipped with a mechanical stirrer and a distillation apparatus was charged with 284 grams of stearic acid and 200 grams of poly(propyleneoxy)-diamine available as JEFFAMINE D400™ from Huntsman Corporation. The mixture was then heated to 165° C. over a 2 hour period, followed by increasing the temperature to 185° C. over a 1 hour period. The pressure was then reduced from atmospheric pressure to 40 millimeters Hg, and these conditions maintained for an additional 2 hours, wherein the total amount of water collected in the distillation receiver was measured to be about 17 milliliters. The pressure was then increased to atmospheric pressure and the product poured into a metal container and left undisturbed to cool down to room temperature.

100 Grams of the above product were then dissolved in 300 grams of methanol with stirring at about 45° C. To this was then added 10 mole percent of potassium iodide (1.1 grams), and the mixture was stirred to room temperature. The product, crystallized out, was filtered and washed repeatedly with water. The product displayed a melting point of about 60° C., a viscosity of 7.0 centipoise, and a conductivity of 7.1 log(picomho/cm) at 150° C.

EXAMPLE IV

A conductive mixture containing 75 grams of magnesium nitrate hexahydrate (MP 89° C.) and 25 grams of the oxyalkylene compound ethylene diamine tetrakis (propoxylate-block-ethoxylate)tetrol, (Aldrich #43,553-8) (MP 58° C.) was melt blended at 100° C. and stirred for 30 minutes, followed after that by cooling to 25° C. The mixture displayed a melting point of about 80° C., a viscosity of 6.0 centipoise, and a conductivity of 7.2 log (picomho/cm) at 150° C.

EXAMPLE V

A black phase-change ink composition was prepared by mixing 45 percent by weight of the potassium iodide salt of Example I, N,N'-(ethyleneoxyethyleneoxyethylene)-bis-(stearamide) with a melting point of 114° C., a viscosity of 6.9 centipoise at 150° C., and a conductivity of 6.8 log (picomho/cm); 20 percent by weight of the solid ink vehicle N,N'-dodecylene bis-lauramide, having a melting point of 100° C., a viscosity of 6.8 centipoise at 150° C.; 20 percent by weight of the viscosity modifying compound hexanoamide, (Aldrich #29,339-3), having a melting point of 101° C., an acoustic-loss value of 39 dB/mm and conductivity of 6.0 [log(pico.mho/cm)]; 5 percent by weight of the UV absorber [1,2,2,6,6-pentamethyl-4-piperidinyl β,β, β',β'-tetramethyl-3,9-(2,4,8,10-tetraoxo spiro (5,5) undecane) diethyl]-1,2,3,4-butane tetracarboxylate, Mixxim HALS 63, Fairmount Corporation; 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Neozapon Black X51 [C.I. Solvent Black, C.I. #12195]

(BASF). The resulting mixture was heated to a temperature of about 120° C. and stirred for a period of about 60 minutes until it formed a homogeneous solution, and subsequently the solution was cooled to 25° C. The black ink resulting had an acoustic loss value of 38 dB/mm, a viscosity of 5.8 cps and a conductivity of 6.4 [log(pico.mho/cm)] at 150° C.

EXAMPLE VI

A blue phase-change ink composition was prepared by mixing 45 percent by weight of the Example II potassium iodide salt of N,N'-poly(propyleneoxy)-bis-(stearamide), having a melting point of 60° C., a viscosity of 7.1 centipoise, and a conductivity of 7.0 log(picomho/cm) at 150° C.; 20 percent by weight of 2-stearyl-5-(hydroxymethyl)-5'(methoxy stearate) oxazoline having a melting point of 62° C. and an acoustic-loss value of 35 dB/mm and a conductivity of 6.0 [log(pico.mho/cm)]; 20 percent by weight of the viscosity modifying compound N,N'-octamethylene-bis(dichloroacetamide), (Aldrich #14,750-8), with a melting point of 126° C. and an acoustic-loss value of 34 dB/mm; 5 percent by weight of the UV absorber 2-dodecyl-N-(2,2,6,6-tetra methyl-4-piperidinyl) succinimide, (Aldrich #41,317-8); 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Blue 670 [C.I. #61554] (BASF). The resulting mixture was heated to a temperature of about 120° C. and stirred for a period of about 60 minutes until it formed a homogeneous solution, and subsequently was cooled to 25° C. The resulting blue ink had an acoustic loss value of 36 dB/mm, a viscosity of 5.65 cps at 150° C., and conductivity of 6.5 [log(pico.mho/cm] at 150° C.

EXAMPLE VII

A yellow phase-change ink composition was prepared by mixing 45 percent by weight of Example III potassium iodide salt of N,N'-poly(propyleneoxy)-bis-(stearamide) having a melting point of 60° C., a viscosity of 7.0 centipoise, an acoustic-loss value of 35 dB/mm and conductivity of 7.1 [log(pico.mho/cm)]; 20 percent by weight of (S)-(-)-tetrahydro-5-oxo-3-furanyl carbamate, (Aldrich #41,924-9) having a melting point of 104° C. and an acoustic-loss value of 38 dB/mm; 20 percent by weight of the viscosity modifying compound octadecanamide, (Aldrich #,60-1), having a melting point of 103° C. and an acoustic-loss value of 33 dB/mm; 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Yellow 146 [C.I. #12700] (BASF). The mixture resulting was heated to a temperature of about 120° C. and stirred for a period of about 60 minutes until it formed a homogeneous solution, and subsequently the solution mixture was cooled to 25° C. The yellow ink resulting had an acoustic loss value of 38 dB/mm and a viscosity of 5.55 cps, conductivity of 6.5 [log(pico.mho/cm] at 150° C.

EXAMPLE VIII

A red phase-change ink composition was prepared by mixing 45 percent by weight of the Example IV conductive salt of magnesium nitrate hexahydrate and ethylene diamine tetrakis(propoxylate-block-ethoxylate)tetrol, (Aldrich #43,553-8) having a melting point of about 80° C., a viscosity of 6.0 centipoise, an acoustic-loss value of 38 dB/mm and a conductivity of 7.2 log(picomho/cm); 20 percent by weight of the solid ink vehicle tert-butyl carbamate, (Aldrich #16,739-8) having a melting point of 106° C. and an acoustic-loss value of 40dB/mm; 20 percent by weight of the viscosity modifying compound hexanoamide, (Aldrich #29,339-3) with a melting point of 101° C. and an acoustic-loss value of 33 dB/mm; 5 percent by weight of the UV absorber 2-dodecyl-N-(2,2,6,6-tetramethyl-4-piperidinyl) succinimide, (Aldrich #41,317-8); 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Red 462 [C.I. #26050] (BASF). The mixture was heated to a temperature of about 120° C. and stirred for a period of about 60 minutes until it formed a homogeneous solution, and subsequently was cooled to 25° C. The resulting red ink had an acoustic loss value of 33 dB/mm, a viscosity of 5.72 cps and conductivity of 6.5 at 150° C.

Each of the above four inks was incorporated into an acoustic ink jet printing test fixture. A jetting frequency of 160 MHz was used to generate drops of about 2 picoliters, up to 12 drops per pixel at 600 spi. The images formed on paper exhibited excellent color quality with optical density values of 2.65 (black), 2.05 (cyan), 1.95 (magenta), 1.45 (yellow), sharp edges, with lightfast values of black (98.5 percent), cyan (97.5 percent), magenta (97 percent), yellow (100 percent), waterfast values of black (98.5 percent), cyan (99.5 percent), magenta (97 percent), yellow (100 percent). The crease values of black, cyan, magenta and yellow ink images were measured at black (4), cyan (7), magenta (8), yellow (8). The images formed on uncoated MYLAR™ exhibited excellent color quality with optical density values of 1.55 (black), 1.56 (cyan), 1.48 (magenta), 0.95 (yellow), sharp edges. The haze values of black, cyan, magenta and yellow ink images were measured at black (10), cyan (9), magenta (7), yellow (10). The gloss values of images were measured at about 90 for all the above inks. The ink spherulite radius was measured between about 1 to about 3 micrometers leading to haze values of between 10 to 15 when printed on transparencies.

Compared to the inks of U.S. Pat. No. 5,698,017 comprised of blends of 2-stearyloxazoline, 95 percent by weight and a colorant selected from Neozapon Black X51 [C.I. Solvent Black, C.I. #12195] (BASF); Sudan Blue 670 [C.I. #61554] (BASF); Sudan Yellow 146 [C.I. #12700] (BASF); Sudan Red 462 [C.I. #26050] (BASF); 5 percent by weight (conductivity of 5.5 to 6.0 log pico.mho/cm), that yield images on paper having crease values of between 65 to 125, gloss values of 60 to 80 and ink spherulite radius (ink spherulite radius is defined as the radius of the ink spheres formed when the ink cools down from the molten state at the jetting temperature of 150° C. to room temperature of 25° C.) of between about 8 to about 9 micrometers, the inks of the present invention generated images with optical density values of 2.50 (black), 1.92 (cyan), 1.95 (magenta), 1.45 (yellow), sharp edges, with lightfast values of black (99.0 percent), cyan (98.5 percent), magenta (96.7 percent), yellow (99 percent), waterfast values of black (98.5 percent), cyan (97.5 percent), magenta (96 percent), yellow (100 percent). The crease values of the invention black, cyan, magenta and yellow ink images were measured at black (5), cyan (10), magenta (10), yellow (9); the images formed on uncoated MYLAR™ exhibited excellent color quality with optical density values of 1.55 (black), 1.56 (cyan), 1.48 (magenta), 0.95 (yellow), sharp edges. The haze values of black, cyan, magenta and yellow ink images were measured at black (13), cyan (15), magenta (10), yellow (12); the ink spherulite radius was measured between 1 to 3 micrometers leading to haze values of between about 10 to about 15 when printed on transparencies. High haze values of, for example, between about 10 and about 15 result in unacceptable when an imaged transparency is projected on to a screen the light of the projector does not fully pass through the image thereby decreasing its projection efficiency from 100 to about 75 or about 80 percent and the colors are muddier than normal such as yellow looks like orange, and red looks like dark brown.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) a mixture comprised of a salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant.

2. An ink composition in accordance with claim 1 wherein (1) said mixture possesses an acoustic-loss value of from about 25 to about 80 dB/mm; (2) said solid ink vehicle compound possesses a melting temperature of from about 75° C. to about 100° C., and an acoustic-loss value of from about 15 to about 60 dB/mm; (3) said amide compound possesses an acoustic-loss value of from about 5 to about 40 dB/mm, and which ink optionally yields images with crease values of from about 4 to about 8, haze values of from about 7 to about 10, gloss values of from about 85 to about 90, and which ink possesses an acoustic-loss value of from about 10 to about 80 dB/mm, a viscosity of from about 1 centipoise to about 15 centipoise at a temperature of from about 125° C. to about 165° C., and said ink possesses a conductivity of from about 6.5 to about 8 [log(pico.mho/cm)] at a temperature of from about 120° C. to about 170° C.

3. An ink composition in accordance with claim 1 wherein the mixture (1) possesses a melting point of from about 75° C. to about 100° C. and is present in an amount of from about 1 to about 59 percent by weight, the ink vehicle compound possesses a melting point of from about 80° C. to about 100° C. and is present in an amount of from about 69 to about 0.5 percent by weight, the amide compound is present in an amount of from about 29 to about 0.5 percent by weight, the lightfastness component is present in an amount of from about 0.25 to about 10 percent by weight, the antioxidant is present in an amount of from about 0.25 to about 10 percent by weight, and the colorant is present in an amount of from about 0.5 to about 20 percent by weight, and wherein the total amount of all of said ink components is about 100 percent.

4. An ink composition in accordance with claim 1 wherein said salt is an inorganic salt selected from the group consisting of (1) potassium bromide; (2) potassium iodide; (3) lithium bromide; (4) sodium iodide; (5) zinc chloride hexahydrate; (6) magnesium chloride hexahydrate; (7) magnesium nitrate hexahydrate; (8) calcium nitrate tetrahydrate; (9) strontium chloride hexahydrate, and (10) magnesium acetate tetrahydrate.

5. An ink in accordance with claim 4 wherein said salt is present in an amount of from about 0.25 percent by weight to about 45 percent by weight.

6. An ink composition in accordance with claim 1 wherein in the salt is an organic salt selected from the group consisting of (1) D-lactic acid lithium salt; (2) D-gluconic acid potassium salt; (3) pantothenic acid sodium salt; (4) citric acid disodium salt; (5) 1-dodecane sulfonic acid sodium salt; (6) pantothenic acid calcium salt monohydrate; (7) tricalcium dicitrate tetrahydrate; (8) undecylenic acid zinc salt; (9) urea phosphate, and (10) urea sulfate.

7. An ink in accordance with claim 6 wherein said salt is present in an amount of from about 10 percent by weight to about 20 percent by weight.

8. An ink composition in accordance with claim 1 wherein the oxyalkylene compound is an alkylene oxide containing oxyalkylene, and wherein said compound is an oxyalkylene amide selected from the group consisting of (1) N,N'-(ethyleneoxy-ethyleneoxy-ethylene)-bis-stearamide; (2) N,N'-(ethyleneoxy-ethyleneoxy-ethylene oxy-ethylene)-bis-stearamide; (3) N,N'-(ethyleneoxy-ethyleneoxy-ethyleneoxy-ethyleneoxy-ethylene)-bis-stearamide; (4) N,N'-(propyleneoxy-propyleneoxy-propylene)-bis-stearamide; (5) N,N'-propylene oxy-propyleneoxy-propyleneoxy-propylene)-bis-stearamide, and (6) N,N'-propyleneoxy-propyleneoxy-propyleneoxy-propyleneoxy-propylene)-bis-stearamide.

9. An ink composition in accordance with claim 8 wherein said compound is present in an amount of from about 0.25 to about 45 weight percent.

10. An ink composition in accordance with claim 1 wherein the oxyalkylene compound is an alkylene oxide containing oxyalkylene, and wherein said compound is a poly(oxyalkylene)-alkylate selected from the group consisting of (1) N,N'-propyleneoxy-propyleneoxy-propyleneoxy-propyleneoxy-propylene)-acetate; (2) N,N'-(ethyleneoxy-ethyleneoxy-ethylene)-stearate; (3) N,N'-(ethyleneoxy-ethyleneoxy-ethyleneoxy-ethyleneoxy-ethylene)-stearate; (4) N,N'-(propyleneoxy-propyleneoxy-propylene)-stearate; (5) N,N'-(ethyleneoxy-ethyleneoxy-ethylene)-laurate; (6) N,N'-(ethyleneoxy-ethyleneoxy-ethyleneoxy-ethyleneoxy-ethylene)-laurate; (7) N,N'-(propyleneoxy-propyleneoxy-propylene)-laurate; (8) N,N'-propyleneoxy-propyleneoxy-propyleneoxy-propylene)-laurate, and (9) N,N'-propyleneoxy-propyleneoxy-propyleneoxy-propyleneoxy-propylene)-laurate.

11. An ink composition in accordance with claim 10 wherein said alkylene oxide compound is present in an amount of from 0.25 to about 45 weight percent.

12. An ink composition in accordance with claim 1 wherein in said compound of (1) is a poly(oxyalkylene)-dialkylate selected from the group consisting of (1) N,N'-(ethyleneoxy-ethylene oxy-ethylene)-diacetate; (2) N,N'-propyleneoxy-propyleneoxy-propyleneoxy-propylene)-diacetate; (3) N,N'-propyleneoxy-propyleneoxy-propyleneoxy-propyleneoxy-propylene)-diacetate; (4) N,N'-(ethyleneoxy-ethyleneoxy-ethylene)-distearate; (5) N,N'-(propyleneoxy-propyleneoxy-propylene)-distearate; (6) N,N'-propyleneoxy-propyleneoxy-propyleneoxy-propyleneoxy-propylene)-distearate; (7) N,N'-(ethyleneoxy-ethyleneoxy-ethyleneoxy-ethyleneoxy-ethylene)-dilaurate; (8) N,N'-(propyleneoxy-propyleneoxy-propylene)-dilaurate; (9) N,N'-propyleneoxy-propyleneoxy-propyleneoxy-propylene)-dilaurate, and (10) N,N'-propyleneoxy-propyleneoxy-propyleneoxy-propyleneoxy-propylene)-dilaurate.

13. An ink composition in accordance with claim 8 wherein said compound is present in an amount of from about 0.25 to 45 weight percent.

14. An ink composition in accordance with claim 1 wherein in the compound of (1) is a polyoxa-alkanoate ester selected from the group consisting of (1) methyl 3,6-dioxaheptanoate; (2) butyl 3,6-dioxaheptanoate, heptyl 3,6-dioxaheptanoate; (3) octyl 3,6-dioxaheptanoate; (4) dodecyl 3,6-dioxaheptanoate; (5) stearyl 3,6-dioxaheptanoate; (6) ethyl 3,6,9-trioxadecanoate; (7) neopentyl 3,6,9-trioxadecanoate; (8) nonyl 3,6,9-trioxadecanoate; (9) decyl 3,6,9-trioxadecanoate, and (10) stearyl 3,6,9-trioxadecanoate.

15. An ink composition in accordance with claim 1 wherein in the compound (1) is a polyoxa-alkanoate diester selected from the group consisting of (1) dimethyl 3,6,9-trioxaundecanedioate; (2) diethyl 3,6,9-trioxaundecanedioate; (3) dipropyl 3,6,9-trioxaundecanedioate; (4) isopropyl 3,6,9-trioxaundecanedioate; (5) dibutyl 3,6,9-trioxaundecanedioate; (6) dihexyl 3,6,9-trioxaundecanedioate; (7) diheptyl 3,6,9-trioxaundecanedioate; (8) dioctyl 3,6,9-trioxaundecanedioate; (9) dinonyl 3,6,9-trioxaundecanedioate, and (10) didodecyl 3,6,9-trioxaundecanedioate.

16. An ink composition in accordance with claim 1 wherein the compound of (1) is present in an amount of from about 25 percent by weight to about 75 percent by weight, and said salt is present in an amount of from about 75 percent by weight to about 25 percent by weight, and wherein the total amount of said compounds in the mixture is about 100 percent.

17. An ink composition in accordance with claim 1 wherein in the ink vehicle is a bisamide selected from the group consisting of (1) N,N'-ethylene bis-stearamide; (2) N,N'-hexylene bis-stearamide; (3) N,N'-decylene bis-stearamide; (4) N,N'-dodecylene bis-stearamide; (5) N,N'-stearylene bis-stearamide; (6) butylene bis-lauramide; (7) N,N'-hexylene bis-lauramide; (8) N,N'-octylene bis-lauramide; (9) N,N'-dodecylene bis-lauramide, and (10) N,N'-stearylene bis-lauramide trioxaundecanedioate.

18. An ink composition in accordance with claim 1 wherein in the ink vehicle is 2-stearyl-5-(hydroxymethyl)-5'(methoxy stearate) oxazoline.

19. An ink composition wherein said vehicle is present in an amount of from about 0.5 to about 69 weight percent.

20. An ink composition in accordance with claim 1 wherein in the ink vehicle is a carbamate selected from the group consisting of (1) tert-butyl carbamate; (2) benzyl carbamate; (3) benzyl N-hydroxycarbamate; (4) 4,4'-methylene-bis(dibutyldithio carbamate); (5) benzyl(S)-(–)-tetrahydro-5-oxo-3-furanyl carbamate; (6) diethyl dithiocarbamic acid, sodium salt, trihydrate.

21. An ink composition in accordance with claim 1 wherein the amide compound is selected from the group consisting of (1) iodoacetamide; (2) isobutyramide; (3) hexanoamide; (4) N,N'-hexamethylene bisacetamide; (5) erucamide; (6) octadecanamide; (7) N-(4-hydroxyphenyl) stearamide; (8) N-methyinicotineamide; (9) 4-acetamido-2,2,6,6-tetramethylpiperadine, and (10) N,N'-octamethylene-bis(dichloroacetamide).

22. An ink composition in accordance with claim 1 wherein the lightfastness component is selected from the group consisting of (1) 1,1-(1,2-ethane-diyl)bis(3,3,5,5-tetramethyl piperazinone); (2) 2,2,4-trimethyl-1,2-hydro quinoline; (3) 2-(4-benzoyl-3-hydroxyphenoxy) ethylacrylate; (4) 2-dodecyl-N-(1,2,2,6,6-pentamethyl-4-piperidinyl)succinimide; (5) 2,2,6,6-tetramethyl-4-piperidinyl/β,β,β',β'-tetramethyl-3,9-(2,4,8,10-tetraoxospiro (5,5)-undecane) diethyl]-1,2,3,4-butane tetracarboxylate.

23. An ink composition in accordance with claim 1 wherein the lightfastness antioxidant is selected from the group consisting of (1) antimony dialkyl phosphorodithioate; (2) molybdenum oxysulfide dithio carbamate; (3) (nickel-bis(o-ethyl(3,5-di-tert-butyl-4-hydroxybenzyl) phosphonate; (4) 4,4'-methylene-bis(dibutyldithio carbamate), and (5) tetra sodium-N-(1,2-dicarboxyethyl)-N-octadecyl sulfosuccinamate.

24. A printing process which comprises incorporating into an acoustic ink jet printer an ink comprised of (1) a mixture comprised of a salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant, and causing droplets of the ink to be ejected in imagewise pattern onto a substrate.

25. A process which comprises (a) providing an acoustic ink printer having a pool of a liquid ink comprised of an ink composition comprised of (1) a mixture comprised of a salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant, with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

26. An ink in accordance with claim 1 wherein the colorant is a pigment, or a dye present in an amount of from about 0.5 to about 20 percent by weight.

27. An ink in accordance with claim 1 wherein the colorant is a pigment of carbon black.

28. An ink in accordance with claim 1 wherein the colorant is cyan, magenta, yellow, black, or mixtures thereof.

29. An ink composition in accordance with claim 1 wherein the mixture (1) is present in an amount of from about 1 to about 59 percent by weight, the salt is potassium iodide, magnesium nitrate hexahydrate, D-lactic acid lithium salt, dodecyl sulfate lithium salt, oleic acid potassium salt, the oxyalkylene compound is selected from the group consisting of N,N'-(ethyleneoxy-ethyleneoxy-ethyleneoxy-ethyleneoxy-ethylene)-bis-stearamide, N,N'-(ethyleneoxy-ethyleneoxy-ethyleneoxy-ethyleneoxy-ethylene)-dilaurate, and stearyl 3,6,9-trioxadecanoate, the ink vehicle compound is present in an amount of from about 69 to about 0.5 percent by weight and is selected from the group consisting of N,N'-stearylene bis-stearamide, 2-stearyl-5-(hydroxymethyl)-5'(methoxy stearate) oxazoline, and tert-butyl carbamate, the amide compound is present in an amount of from about 29 to about 0.5 percent by weight, and is N,N'-hexamethylene bisacetamide, or erucamide, the lightfastness component is present in an amount of from about 0.25 to about 10 percent by weight and is 2-dodecyl-N-(2,2,6,6-tetramethyl-4-piperidinyl) succinimide, or [1,2,2,6,6-pentamethyl-4-piperidinyl/β,β,β', β'-tetramethyl-3,9-(2,4,8,10-tetraoxo spiro (5,5) undecane) diethyl]-1,2,3,4-butane tetracarboxylate, the antioxidant is present in an amount of from about 0.25 to about 10 percent by weight and is tetra-sodium-N-(1,2-dicarboxyethyl)-N-octadecyl-sulfosuccinamate), or molybdenum oxysulfide dithio carbamate, and the colorant is present in an amount of from about 0.5 to about 20 percent by weight, and wherein the total of all ink components is about 100 percent.

30. An ink in accordance with claim 29 with a conductivity of from about 6.4 to about 7 [log(pico.mho/cm)], a viscosity of from about 1 centipoise to about 10 centipoise, and which ink yields images with crease values of about 4 to about 8, haze values of about 7 to about 10, and gloss values of about 85 to about 90.

31. An ink in accordance with claim 1 with a conductivity of from about 6 to about 7.0 [log(pico.mho/cm)], a viscosity of from about 1 centipoise to about 10 centipoise and an acoustic loss of from about 10 to about 80 dB/mm, and which ink yields images with crease values of about 4 to about 8, haze values of about 7 to about 10, and gloss values of about 85 to about 90.

32. An ink composition in accordance with claim 1 wherein in the conductive mixture the salt is potassium iodide; the oxylene compound is N,N'-(ethylene oxyethyleneoxy-ethyleneoxy-ethyleneoxy-ethylene)-bisstearamide; the ink vehicle compound is 2-stearyl-5-(hydroxymethyl)-5'(methoxy stearate) oxazoline; the viscosity modifier is N,N'-hexamethylene bisacetamide; the lightfastness compound is a UV absorber of 2-dodecyl-N-(2,2,6,6-tetramethyl-4-piperidinyl) succinimide; the antioxidant is tetra-sodium-N-(1,2-dicarboxyethyl)-N-octadecylsulfosuccinamate), and which ink possesses a conductivity of from about 6.5 to about 7 [log(pico.mho/cm)].

33. An ink composition in accordance with claim 1 and which ink contains no water.

34. An ink composition in accordance with claim 1 and which ink is substantially free of water.

35. An ink composition in accordance with claim 1 and which ink is conductive.

36. An ink comprised of (1) a salt and an oxyalkylene; (2) an ink vehicle; (3) an amide; (4) a lightfastness compound; (5) an antioxidant; and (6) a colorant.

37. An ink in accordance with claim 36, which ink is conductive and which ink contains no water.

38. An ink in accordance with claim 36 wherein said oxyalkylene compound is an alkylene oxide containing oxyalkylene compound.

39. An ink in accordance with claim 1 wherein said amide (3) primarily functions as a viscosity ink modifying compound.

40. A printing process which comprises developing a generated image with an ink incomposition comprised of (1) a salt and an oxyalkylene; (2) an ink vehicle; (3) an amide; (4) a lightfastness compound; (5) an antioxidant; and (6) a colorant.

41. An ink in accordance with claim 1 wherein said salt is an inorganic salt.

42. An ink in accordance with claim 1 wherein said salt is an organic salt.

43. An ink composition comprised of (1) a mixture comprised of a salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant and wherein said salt is an organic salt or an inorganic salt.

44. An ink in accordance with claim 43 wherein said inorganic salt is selected from the group consisting of (1) potassium bromide; (2) potassium iodide ; (3) lithium bromide; (4) sodium iodide; (5) zinc chloride hexahydrate; (6) magnesium chloride hexahydrate; (7) magnesium nitrate hexahydrate; (8) calcium nitrate tetrahydrate; (9) strontium chloride hexahydrate, and (10) magnesium acetate tetrahydrate.

45. An in k in accordance with claim 43 wherein said organic salt is selected from the group consisting of (1) D-lactic acid lithium salt; (2) D-gluconic acid potassium salt; (3) pantothenic acid sodium salt; (4) citric acid disodium salt; (5) 1-dodecane sulfonic acid sodium salt; (6) pantothenic acid calcium salt monohydrate; (7) tricalcium dicitrate tetrahydrate; (8) undecylenic acid zinc salt; (9) urea phosphate, and (10) urea sulfate.

46. An ink composition comprised of (1) a mixture comprised of a salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant, and wherein said oxyalkylene compound is an alkylene oxide containing oxyalkylene, and wherein said compound is an oxyalkylene amide selected from the group consisting of (1) N,N'-(ethyleneoxyethyleneoxy-ethylene)-bis-stearamide; (2) N,N'-(ethyleneoxy-ethyleneoxy-ethylene oxy-ethylene)-bisstearamide; (3) N,N'-(ethyleneoxy-ethyleneoxyethyleneoxy-ethyleneoxy-ethylene)-bis-stearamide; (4) N,N'-(propyleneoxy-propyleneoxy-propylene)-bisstearamide; (5) N,N'-propylene oxy-propyleneoxypropyleneoxy-propylene)-bis-stearamide, and (6) N,N'-propyleneoxy-propyleneoxy-propyleneoxy-propyleneoxypropylene)-bis-stearamide.

47. An ink composition comprised of (1) a mixture comprised of an organic salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant.

48. An ink composition consisting essentially of (1) a mixture consisting essentially of a salt and an oxyalkylene compound wherein said mixture possesses a melting temperature of from about 60° C. to about 120° C.; (2) an ink vehicle; (3) an amide compound; (4) a lightfastness component; (5) a lightfastness antioxidant; and (6) a colorant.

49. An ink in accordance with claim 5 wherein said salt is present in an amount of from about 10 percent by weight to about 20 percent by weight.

50. An ink in accordance with claim 9 wherein said compound is present in an amount of from about 1 to about 25 weight percent.

51. An ink in accordance with claim 11 wherein said alkylene oxide is present in an amount of from about 0.75 to about 25 weight percent.

52. An ink in accordance with claim 13 wherein said compound is present in an amount of from about 0.75 to about 25 weight percent.

53. An ink in accordance with claim 6 wherein said salt is an inorganic salt.

54. An ink in accordance with claim 36 wherein said salt is an organic salt.

55. An ink in accordance with claim 6 in which ink is conductive.

* * * * *